(12) United States Patent
Suzuyama et al.

(10) Patent No.: US 6,874,106 B2
(45) Date of Patent: Mar. 29, 2005

(54) METHOD AND DEVICE FOR NOTIFYING SERVER FAILURE RECOVERY

(75) Inventors: Shigeru Suzuyama, Fukuoka (JP); Tadashi Iwahashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/043,740

(22) Filed: Jan. 9, 2002

(65) Prior Publication Data

US 2003/0028817 A1 Feb. 6, 2003

(30) Foreign Application Priority Data

Aug. 6, 2001 (JP) ........................................ 2001-238496

(51) Int. Cl.[7] ................................................ G06F 11/00
(52) U.S. Cl. ............................... 714/57; 714/48; 714/4; 709/224
(58) Field of Search ............................... 714/57, 4, 48, 714/47, 27; 709/224; 370/395.32, 395.31

(56) References Cited

U.S. PATENT DOCUMENTS

| | | | | |
|---|---|---|---|---|
| 5,260,945 A | * | 11/1993 | Rodeheffer | 714/4 |
| 5,734,810 A | * | 3/1998 | Tanaka et al. | 714/4 |
| 6,292,905 B1 | * | 9/2001 | Wallach et al. | 714/4 |
| 6,349,335 B1 | * | 2/2002 | Jenney | 709/224 |
| 6,404,743 B1 | * | 6/2002 | Meandzija | 370/254 |
| 6,557,122 B1 | * | 4/2003 | Sugauchi et al. | 714/57 |
| 2004/0019674 A1 | * | 1/2004 | Stevens et al. | 709/224 |

FOREIGN PATENT DOCUMENTS

| | | |
|---|---|---|
| JP | 08-022424 | 1/1996 |
| JP | 2000-188607 | 7/2000 |
| JP | 2001-036552 | 2/2001 |

* cited by examiner

*Primary Examiner*—Robert Beausoliel
(74) *Attorney, Agent, or Firm*—Katten Muchin Zavis Rosenman

(57) ABSTRACT

In a method and a device for notifying a server failure recovery which notify a failure recovery of a server or the like to a client, a server failure detector detects a client having tried but failed to access a server due to a failure, a server recovery detector detects a failure recovery, and a server recovery notifier gives a failure recovery notification to the client having failed to access. Also, the server failure recovery notification device is mounted on a router. The server failure detector detects the client having failed to access based on a destination unreachable message of an ICMP of the router 40, or detects the client having failed to access by determining the failure is being occurred in the server, in the absence of a reply IP packet to the IP packet addressed to the server from the client.

18 Claims, 32 Drawing Sheets

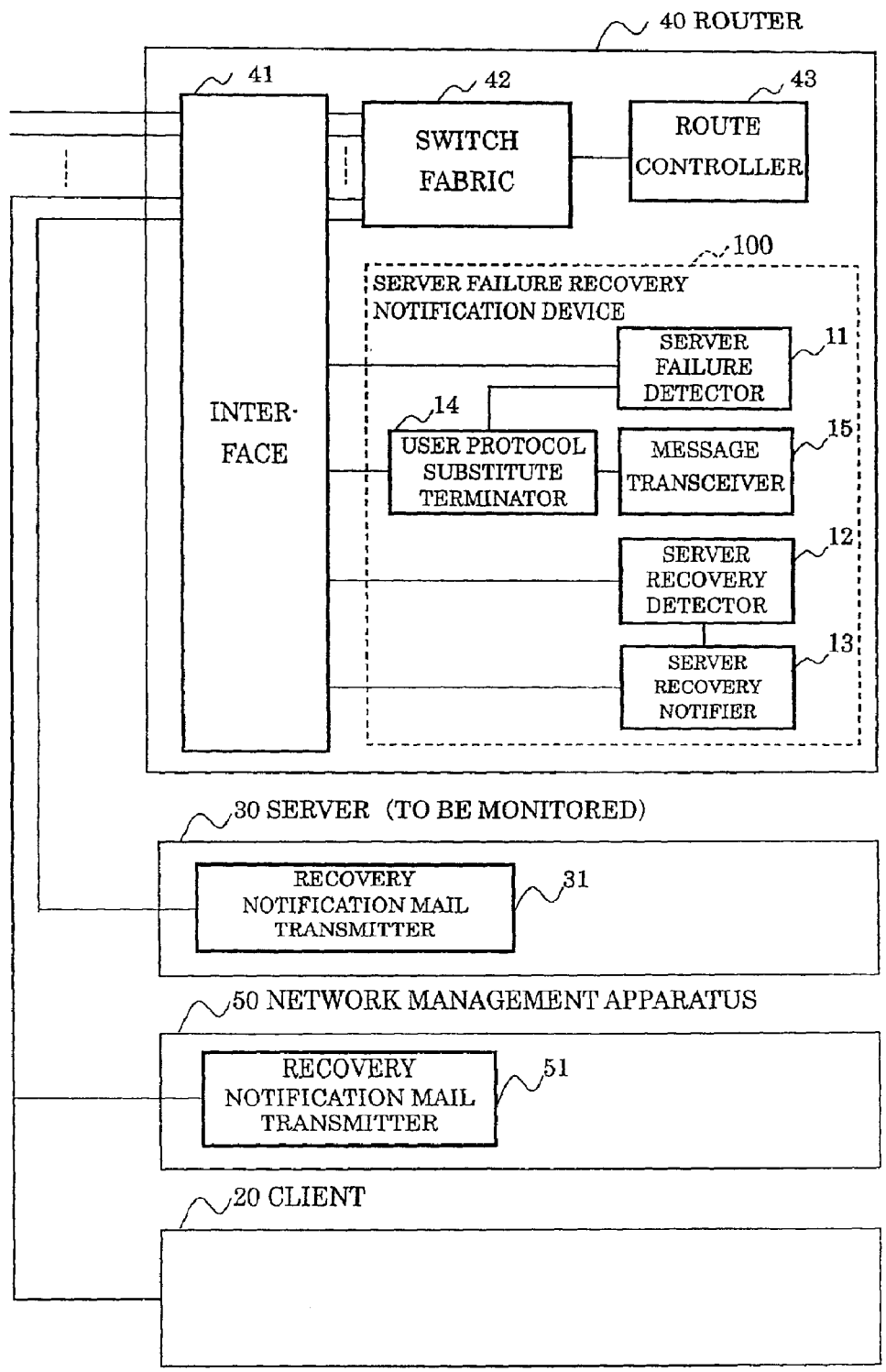

| CLIENT IP ADDRESS | MAIL ADDRESS |
|---|---|
| 172.27.179.150 | Tanaka@xxx.yyy.co.jp |
| 172.27.179.151 | Sato@xxx.yyy.co.jp |
| 172.27.179.152 | Nakamura@xxx.yyy.co.jp |

FIG.4A

WITHOUT REGISTRATION TIME

~ 71a

| FAILED SERVER IP ADDRESS | ACCESSING SOURCE CLIENT IP ADDRESS HEAD LINK NO. | ACCESSING SOURCE CLIENT IP ADDRESS END LINK NO. |
|---|---|---|
| 172.27.178.80 | 1 | 5 |
| . | . | |
| . | . | |
| | | |
| . | . | |

~ 71b

| NO. | ACCESSING SOURCE CLIENT IP ADDRESS | NEXT CLIENT IP ADDRESS LINK NO. |
|---|---|---|
| 1 | 172.27.179.151 | 5 |
| 2 | . | . |
| 3 | . | . |
| 4 | . | . |
| 5 | 172.27.179.152 | 0 (LINK END) |
| 6 | . | . |
| | . | . |

~ 71c

| CLIENT IP ADDRESS EMPTY AREA HEAD LINK NO. | CLIENT IP ADDRESS END LINK NO. |
|---|---|
| 2 | 1000 |

FIG.4B

WITH REGISTRATION TIME

~ 72b

| NO. | ACCESSING SOURCE CLIENT IP ADDRESS | NEXT CLIENT IP ADDRESS LINK NO. | REGISTRATION TIME |
|---|---|---|---|
| 1 | 172.27.179.151 | 5 | 2000/01/04 21:03:12 |
| 2 | 172.27.179.152 | 7 | 2000/01/04 21:04:12 |
| 3 | 172.27.179.155 | 10 | 2000/01/04 21:05:12 |
| . | . | . | . |
| 6 | 172.27.179.152 | 0 | 2000/01/04 21:07:12 |

FIG.7A  IP HEADER

| VERSION | HEADER LENGTH | SERVICE TYPE | TOTAL LENGTH | |
|---|---|---|---|---|
| IDENTIFIER (ID) | | | FLAG | FRAGMENT OFFSET |
| LIFETIME | | PROTOCOL | HEADER CHECKSUM | |
| SOURCE ADDRESS = 172.27.178.15 | | | | |
| DESTINATION ADDRESS = 172.28.50.2 | | | | |
| OPTION (VARIABLE LENGTH) | | | PADDING (VARIABLE LENGTH) | |

FIG.7B  TCP HEADER

| SOURCE PORT NO. | | DESTINATION PORT NO. | |
|---|---|---|---|
| SEQUENCE NO. | | | |
| RECEPTION ACKNOWLEDGEMENT (ACK) | | | |
| DATA OFFSET | RESERVED | CONTROL BIT | WINDOW |
| CHECKSUM | | URGENT POINTER | |
| OPTION (VARIABLE LENGTH) | | PADDING (VARIABLE LENGTH) | |

TO Messr.sato@xxx.yyy.co.jp
　　「SERVER FAILURE RECOVERY NOTIFICATION」
IT IS HEREBY NOTIFIED THAT THE FOLLOWING SERVER HAS RECOVERED.
RECOVERED SERVER : aaa.bbbb.cccc.co.jp ( 172.27.178.80)
RECOVERED TIME　　: yyyy/mm/dd　HH:MM:SS FIG. 15A
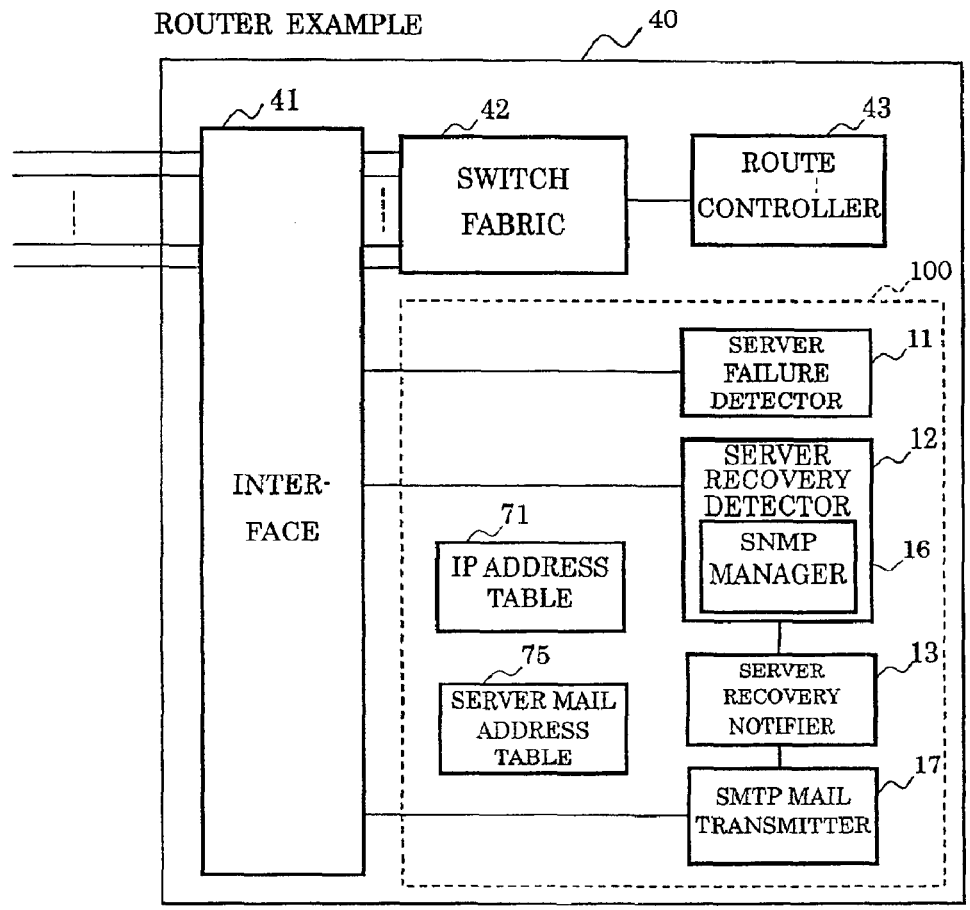
FIG. 15B  SERVER EXAMPLE
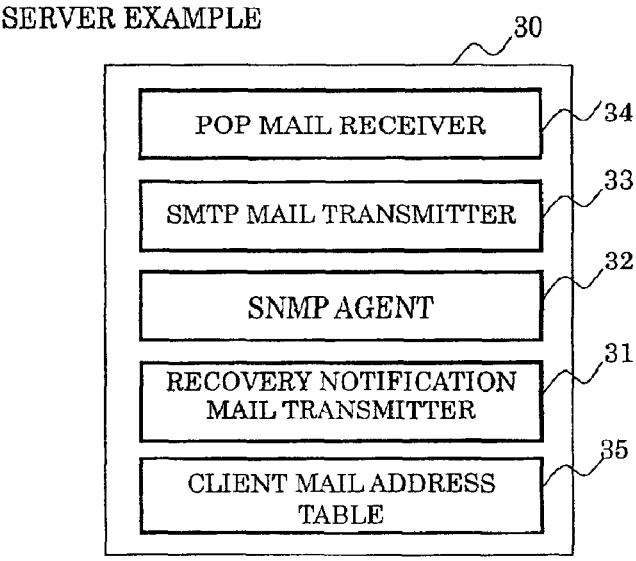

FIG.16

| SERVER IP ADDRESS | MAIL ADDRESS |
|---|---|
| 172.27.178.80 | Sav_1@xxx.yyy.co.jp |
| 172.27.178.81 | Sav_2@xxx.yyy.co.jp |
| 172.27.178.82 | Sav_3@xxx.yyy.co.jp |

| | |
|---|---|
| SERVER IP ADDRESS | : 172.27.178.80 |
| CLIENT IP ADDRESS | : 172.27.179.151 |
| CLIENT IP ADDRESS | : 172.27.179.153 |
| CLIENT IP ADDRESS | : 172.27.179.157 |
| CLIENT IP ADDRESS | : 172.27.179.161 |

| CLIENT IP ADDRESS | MAIL ADDRESS | REGISTRATION DATE & TIME |
|---|---|---|
| 172.27.179.150 | Tanaka@xxx.yyy.co.jp | 2000/01/04 20:23:25 |
| 172.27.179.151 | Sato@xxx.yyy.co.jp | 2000/01/04 21:03:12 |
| 172.27.179.152 | Nakamura@xxx.yyy.co.jp | 2000/01/04 21:24:25 |

74

SCREEN FOR INQUIRING WHETHER OR NOT RECOVERY NOTIFICATION MAIL IS NECESSARY

SCREEN FOR INDICATING RECEPTION COMPLETION OF CLIENT MAIL ADDRESS

METHOD AND DEVICE FOR NOTIFYING SERVER FAILURE RECOVERY

BACKGROUND OF THE INVENTION

1. Field of the Invention

The present invention relates to a method and a device for notifying a server failure recovery, and in particular to a method and a device for notifying a server failure recovery which notify a failure recovery of a server and the like to a client.

Recently, the Internet and an intranet have become widespread over all industrial fields and social systems including general homes. In the Internet and the intranet, a client can easily download information of text, graphic, image, voice, and the like from e.g. a web server and file information from an FTP (File Transfer Protocol) server.

In such an information transmission between the client and the server, when a failure occurs at the server, it is necessary to notify the occurrence and the recovery of the failure to the client.

2. Description of the Related Art

When a client tries to access a server by transmitting a packet requesting a connection (access) thereto and the server can not receive the packet due to a power disconnection or a failure occurrence on the server side, a router which transfers the packet to the server returns to the client a destination unreachable message of an ICMP (Internet Control Message Protocol) for giving an error notification and diagnosing a communication state.

This message allows the client to recognize that the connection request packet has not reached the server. However, the client or its operator can not recognize when the server, to which the access was tried, is powered up or the failure is recovered. Therefore, the client has been required to repeatedly transmit the connection request packet to the server with a time interval until the server is accessed.

When having tried but failed to access a web or an FTP server for browsing a web site or downloading a file, for example, a user is required to try to access the server again. This re-access operation is required to be performed until the server is accessed, which is a very troublesome operation for the user and causes an increase of a network load.

Also, when provided with an SNMP (Simple Network Management Protocol) agent function, the server can notify the startup of the server itself or the failure recovery to the SNMP manager side with the SNMP agent function. However, generally, only a network manager uses the SNMP manager, so that client's user, requiring to know the recovery state of the server most, does not know the fact until the notification from the network manager is obtained.

For solving this problem, in a method and a device for monitoring a client-server system disclosed in the Japanese Patent Application Laid-open No.2001-36552, the servers of two client-server systems operating on the same network respectively include a monitor.

The monitor of the server in one client-server system having detected a failure occurrence or a recovery thereof on the other client-server system notifies the failure or the recovery to the clients of its own client-server system.

Thus, it becomes possible for the monitor to notify the failure or the recovery of the counterpart client-server system to the clients of its own client-server system and for the clients having received the notification to avoid the repetition of a useless access to the server of the counterpart client-server system.

However, in this method and the device for monitoring the client-server system, the failure or the recovery of the system is not notified to the client of the client-server system in which the failure has occurred, requiring to know the failure/recovery state of the server most.

On the other hand, in a network system disclosed in the Japanese Patent Application Laid-open No. 2000-092054, a server has means to transmit the contents of a failure having occurred in the server itself or a failure recovery as a primary failure notification to the network.

Secondary notification means (e.g. a management terminal equipment) having received the primary failure notification notifies the failure occurrence or the failure recovery of the server to the client selected based on the received failure contents and a preset notifying destination client list per failure contents. Thus, it becomes possible to promptly give a failure recovery notification to the clients' users supposed to require to know the occurred failure most without troubling a system manager.

Thus, the method of giving the failure recovery notification, when the server has recovered from a failure, to all of the clients registered in the list is cumbersome because the recovery notification it to be transmitted to even a client which is not going to use the server, and has not been practical since the number of users to whom the failure recovery notification is transmitted becomes too large in an open server and the like which may be used by numerous persons.

Also, in a method and a device for controlling a server access in a client-server system disclosed in the Japanese Patent Application Laid-open No. 2000-188607, at least a single client having detected a failure of the server forms a representative client.

The representative client accepts standby client registration requests from other clients, and notifies the failure recovery notification of the server to the registered standby clients when the failure recovery of the server has been detected. Thus, the standby clients can start a communication with the server.

Thus, the method in which the representative client accepts the registration of the other standby client can eliminate the transmission of the failure recovery notification even to the client which does not try to use the server. However, in this method, the load of the representative client is increased, and additionally the client having tried but failed to access the server has to register itself in the representative client as a standby client.

SUMMARY OF THE INVENTION

It is accordingly an object of the present invention to provide a method and a device for notifying server failure recovery which notify a failure recovery of a server and the like to a client, which prevent the client from repeatedly trying a useless access to a server which the client has failed to access due to a failure occurrence, which eliminate a trouble of giving a failure recovery notification to all of the clients which may use the server, and which eliminate a registration of a client as a standby client.

In order to achieve the above-mentioned object, a method for notifying server failure recovery according to the present invention comprises a first step of detecting a client having tried but failed to access a server due to a failure of at least one of the server and a network; a second step of detecting that the failure has recovered; and a third step of notifying the client having failed to access the server that the failure has recovered (claim 1).

Thus, it becomes possible for the client which knows that the notification is received when the failure has recovered, or its operator to reliably access the server after having received the failure recovery notification without repeatedly trying a useless access to the server inaccessible for a failure occurrence.

Also, the failure recovery notification has only to be given to the client having tried to access during the failure occurrence, thereby enabling the trouble of notifying all of the clients which may use the server to be eliminated.

Also, since the client having tried but failed to access the server is detected by the first step, the client does not have to register itself in the representative client as a standby client like the client disclosed in e.g. the Japanese Patent Application Laid-open No. 2000-188607.

Also, a server failure recovery notification device according to the present invention comprises: a server failure detector for detecting a client having tried but failed to access a server due to a failure of at least one of the server and a network; a server recovery detector for detecting that the failure has recovered; and a server recovery notifier for notifying, when the failure has recovered, the client having failed to access the server that the failure has recovered (claim 2).

FIG. 1 shows a principle of a server failure recovery notification device 100 according to the present invention, which is provided with a server failure detector 11, a server recovery detector 12, and a server recovery notifier 13. It is to be noted that the other components will be described later.

Also, a packet transmitted/received between a client 20 and a server 30 is detected by the server failure recovery notification device 100. In this example, the server failure notification device 100 is included in a router 40 composed of an interface 41, a switch fabric 42, and a route controller 43. The server failure notification device 100 can detect the above-mentioned packet through the interface 41.

The server failure detector 11 detects the client 20 having tried but failed to access e.g. the server 30 for the failure occurrence of at least one of the server 30 and the network.

When the failure recovery detector 12 detects that the failure of the server 30 has recovered, the server recovery notifier 13 notifies the failure recovery to the client 20 having failed to access.

Thus, the arrangement of the server failure recovery notification device 100 prevents the client 20 which knows that the notification is received when the failure of the server 30 has recovered or its operator from repeating a useless access to the server 30 which can not be accessed for the failure occurrence.

Also, since the server failure detector 11 detects the client 20 having tried to access the server 30, the client 20 having tried to access does not have to register itself as a standby client.

Furthermore, the server recovery notifier 13 has only to give the failure recovery notification to the client 20 having tried to access during the failure occurrence.

Also, the server failure recovery notification device according to the present invention may be mounted on a router (claim 3).

Namely, as shown in FIG. 1, the server failure recovery notification device 100 according to the present invention may be mounted on the router 40.

Also, the server failure recovery notification device according to the present invention may be mounted on a component except a router (claim 4).

Namely, the server failure recovery notification device 100 may be arranged in the other components except the router 40 such as the server 30, the network, and the client.

In case the server failure recovery notification device 100 is arranged within e.g. the server 30, the server failure detector 11, the server recovery detector 12, and the server recovery notifier 13 in the device 100 can perform the above-mentioned operation lest the operation of the server failure recovery notification device 100 be stopped even upon a failure in the server 30.

Also, when the server failure recovery notification device 100 is arranged on the network, the arrangement of the server failure recovery notification device 100, or the input/output signal of the server failure detector 11, the server recovery detector 12, and the server recovery notifier 13 has to be determined so that the server failure detector 11, the server recovery detector 12, and the server recovery notifier 13 may perform the above-mentioned operation.

For example, the server failure recovery notification device 100 may be arranged in a position where a flow of the packet transmitted/received between the server 30 and the client can be grasped.

Also, in the present invention according to the above-mentioned invention, the server failure detector may detect a destination unreachable message indicating that a packet transmitted from the client in order to try to access the server has not reached the server, and may have an IP address table for specifying the client having failed to access by associating an IP address of the server included in the message with an IP address of the client (claim 5).

In FIG. 1, the router 40 which mounts thereon the server failure recovery notification device 100 according to the present invention is arranged in the position relaying the packet transmitted by the client 20 has transmitted to the server 30. The router 40 transmits the packet which the client 20 transmits to the server 30, e.g. in order to try to access, toward the destination server 30 directly or through another router.

When the packet cannot be transferred to the destination server due to a failure of the destination server 30, a network failure on the way thereto (e.g. disconnection), a failure of another relaying router, or the like, the router 40 outputs e.g. a destination unreachable message of an ICMP to the client 20.

The server failure detector 11 detects the destination unreachable message and prepares an IP address table (not shown) associating an IP address of the server 40 included in the message with an IP address of the client having tried to access the server.

This IP address table allows the server failure detector 11 to associate the server 30 in which a failure is being occurred with the client 20 having tried but failed to access the server 30 to be stored.

Also, in the present invention according to the above-mentioned invention, the server failure detector may detect a destination IP address and a source IP address included in a packet addressed to the server from the client transferred by the router, may monitor an IP packet addressed to the client from the server transferred by the router, may determine that a failure is being occurred in the server when the IP packet addressed to the client from the server is not detected even after a lapse of a predetermined time, and may have an IP address table for specifying the client having failed to access by associating the destination IP address with the source IP address (claim 6).

The server failure recovery notification device 100 according to the present invention is mounted on the router 40 such as a firewall which transfers the IP packet transmitted/received bidirectionally between the specific server 30 and the client 20.

Namely, the router 40 transfers e.g. a connection request packet received from the specific client 20 to the destination server 30, and reversely transfers the packet received from the server 30 to the specific client 20.

The server failure detector 11 temporarily holds the source IP address and the destination IP address of e.g. the connection request packet to monitor the packet addressed to the client 20 from the server 30 transferred by the router 40. When the packet can not be detected for more than a predetermined time, it is determined that the client 20 having failed to access the server 30 for a failure occurrence and the IP address table associating the destination IP address with the source IP address is prepared.

This IP address table also enables the server failure detector 11 to associate the server 30 in which the failure is being occurred with the client 20 having tried but failed to access the server 30 to be stored.

Also, in the present invention according to the above-mentioned invention, the server recovery detector may detect that the failure has recovered based on a signal from the server indicating that the failure has recovered (claim 7).

Namely, when the failure of the server 30 has recovered, the server 30 transmits the signal indicating the failure recovery to the server failure recovery notification device 100. The server recovery detector 12 detects the failure recovery of the server 30 based on the signal in the server failure recovery notification device 100.

Also, in the present invention according to the above-mentioned invention, the server recovery detector 12 may have an SNMP manager (not shown) function, and the SNMP manager function may receive a trap message from the server 30 having an SNMP agent function (now shown) as a signal indicating that the failure has recovered (claim 8).

Also, in the present invention according to the above-mentioned invention, the server recovery notifier may have a client mail address table in which a client is preliminarily associated with a mail address, and may transmit an e-mail addressed to the mail address indicating that the failure of the server has recovered based on the table (claim 9).

Namely, when the failure of the server 30 has recovered, the server recovery notifier 13 retrieves a mail address corresponding to e.g. the IP address of the client 20 detected by the server failure detector 11 referring to a client mail address table (not shown), and transmits an e-mail indicating that the failure of the server 30 has recovered to the mail address.

Thus, the client 20 or its operator can recognize that the failure of the server 30 has recovered by the e-mail.

Also, in the present invention according to the above-mentioned invention, the server recovery notifier may transmit, to the server, IP address information of the client having failed to access the server based on the IP address table when the failure of the server has recovered, thereby enabling the server to notify the client that the failure of the server itself has recovered (claim 10).

Namely, the server recovery notifier 13 notifies, to the server 30 where the failure has recovered, the IP address of the client 20 having failed to access, instead of directly notifying the client 20 having failed to access the server 30 that the failure of the server 30 has recovered.

The server 30 having received the notification notifies the client 20 having failed to access that the failure of the server 30 itself has recovered. Thus, it becomes possible to give the failure recovery notification of the of the server 30 to the client 20 not from the router 40 but from the server 30.

Also, in the present invention according to the above-mentioned invention, the server may have a client mail address table indicating a client and a client mail address corresponding to the client, thereby enabling the server to notify the client having failed to access the server itself that the failure of the server itself has recovered based on the client mail address table and the IP address information of the client (claim 11).

Namely, the server 30 has a client mail address table (not shown) indicating the client 20 and the corresponding mail address. Based on the client mail address table, and the IP address information of the client 20, the server 30 transmits the server failure recovery notification to the mail address corresponding to the client having failed to access the server 30 itself.

Thus, it becomes possible to transmit the e-mail notifying the failure recovery of the server 30 to the client 20 or its operator not from the router 40 but from the server 30.

Also, in the present invention according to the above-mentioned invention, the server recovery notifier may transmit IP address information of the client having failed to access the server to a network management apparatus based on the IP address table when the failure of the server has recovered, thereby enabling the network management apparatus to notify the client that the failure of the server has recovered (claim 12).

Namely, the server recovery notifier 13 transmits the IP address information of the client 20 having failed to access the server 30 to a network management apparatus 50 (see FIG. 1) based on the IP address table, when the failure of the server 30 has recovered.

The network management apparatus 50 notifies that the failure of the server 30 has recovered to the client 20 whose IP address is included in this information.

Thus, it becomes possible to give the failure recovery notification of the server 30 to the client 20 not from the router 40 but from the network management apparatus 50.

Also, in the present invention according to the above-mentioned invention, the network management apparatus may have a client mail address table indicating a client and a mail address corresponding to the client, thereby enabling the network management apparatus to notify the client having failed to access the server that the failure of the server has recovered based on the client mail address table and the IP address information of the client (claim 13).

Namely, the network management apparatus 50 has a client mail address table (not shown) indicating the client 20 and the corresponding mail address, and transmits the server failure recovery notification mail to the mail address corresponding to the client 20 having failed to access the server 30 based on the client mail address table and the IP address information of the client, when the failure of the server 30 has recovered.

Thus, it becomes possible to transmit the server failure recovery notification mail to the mail address corresponding to the client 20 not from the router 40 but from the network management apparatus 50.

Also, the present invention according to the above-mentioned invention further comprises a message transceiver for transmitting/receiving an inquiring massage inquiring whether or not a failure recovery notification is required and a reply message to the inquiring massage to/from the client having tried but failed to access the server when the failure has recovered, and the server recovery notifier gives the failure recovery notification to the client which requires the failure recovery notification (claim 14).

Namely, a message transceiver 15 (see FIG. 1) transmits a message, to the client 20 having tried but failed to access the server 30, inquiring whether or not the failure recovery notification is required when the failure of the server 30 has recovered.

The client 20, i.e. its operator returns a reply message indicating whether or not the failure recovery notification is required. The server recovery notifier 13 gives the failure recovery notification to the client requiring the server failure recovery notification.

Thus, it becomes unnecessary for the server recovery notifier 13 to transmit the failure recovery notification addressed to the client 20 not requiring the failure recovery notification, thereby enabling a traffic of the network to be decreased.

Also, the present invention according to the above-mentioned invention further comprises a message transceiver for transmitting/receiving an inquiring message of a destination of a failure recovery notification and a reply message to the inquiring message to/from the client having tried but failed to access the server, and the server recovery notifier transmits the failure recovery notification of the destination (claim 15).

Thus, the server recovery notifier 13 can recognize the destination of the client 20 or its operator whose destination of the failure recovery notification of the server is not known, thereby enabling the failure recovery notification to be transmitted to an indefinite number of clients which access the server 30.

Also, the present invention according to the above-mentioned invention further comprises a user protocol substitute terminator for terminating, instead of the server, a connection in which a failure has occurred, the message transceiver transmitting/receiving the messages through the terminator (claim 16).

Namely, a user protocol substitute terminator 14 (see FIG. 1) establishes a pseudo connection between the user protocol substitute terminator 14 itself and the client 20 instead of the server 30. The message transceiver 15 exchanges messages with the client 20 through this connection.

Also, in the present invention according to the above-mentioned invention, the message transceiver may register an IP address of the client which requires the failure recovery notification in an IP address table (claim 17).

Namely, the message transceiver 15 inquires whether or not the failure recovery notification is required when the failure of the server 30 has recovered, so that the client replies thereto.

This triggers the message transceiver 15 to register the IP address of the client 20 requiring the failure recovery notification in the IP address table.

Thus, the IP address of the client requiring the failure recovery notification is registered in the IP address table.

BRIEF DESCRIPTION OF THE DRAWINGS

FIG. 1 is a block diagram showing a principle of a server failure recovery notification device according to the present invention;

FIGS. 4A and 4B are diagrams showing IP address table examples in a server failure recovery notification device according to the present invention;

FIGS. 7A and 7B are diagrams showing header formats of a general IP packet and a TCP packet;

FIG. 8 is a diagram showing an example of a server failure recovery notification mail in a server failure recovery notification device according to the present invention;

FIGS. 15A and 15B are block diagrams showing embodiments (2) and (3) of a server failure recovery notification device according to the present invention;

FIG. 16 is a diagram showing an example of a server mail address table in a server failure recovery notification device according to the present invention;

FIG. 18 is a diagram showing an example of a recovery notifying destination IP address information mail in a server failure recovery notification device according to the present invention;

Throughout the figures, like reference numerals indicate like or corresponding components.

DESCRIPTION OF THE EMBODIMENTS

Figure 2A:
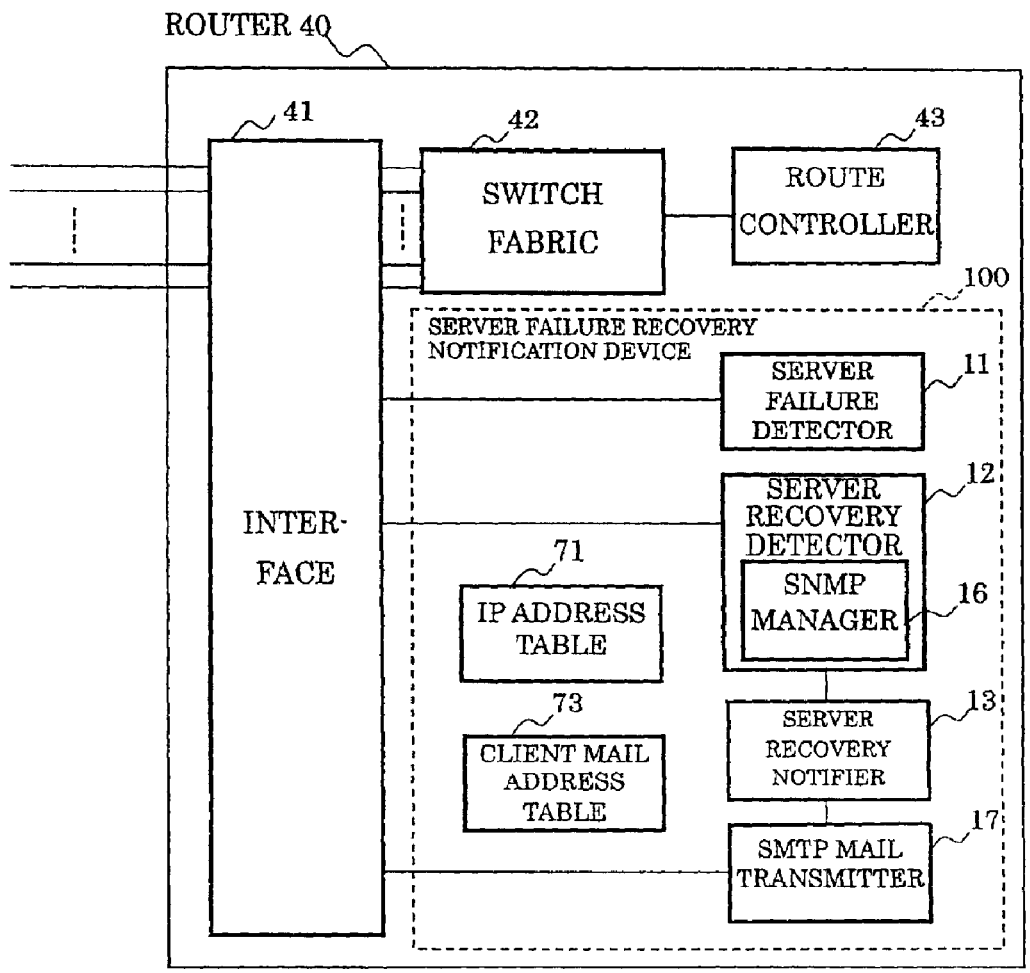
FIGS. 2A and 2B are block diagrams showing an embodiment (1) of a server failure recovery notification device according to the present invention.

[1] Embodiment (1): Server Failure Detection by ICMP Destination Unreachable Message and Direct Failure Recovery Notification to Client FIG. 2A shows an embodiment (1) of the server failure recovery notification device 100 according to the present invention, which is composed of the server failure detector 11, the server recovery detector 12 including an SNMP manager 16, the server recovery notifier 13, an SMTP mail transmitter 17, an IP address table 71, and a client mail address table 73.

The router 40 is composed of the interface 41, the switch fabric 42, and the route controller 43, and routes a general IP packet. The server failure recovery notification device 100 is added to this prior art router 40.

Figure 2B:
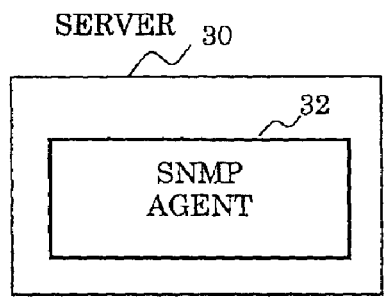

FIG. 2B shows an arrangement of a server 30, which is provided with an SNMP agent 32 for notifying the failure recovery of the server itself to the SNMP manager by an SNMP trap message. The SNMP manager 16 of the server failure recovery notification device 100 is registered in the SNMP agent 32 as an SNMP manager.

Hereinafter, the operations of main components in the server failure recovery notification device 100 and the router 40 will be described.

The server failure detector 11 detects the failure occurrence in the monitored server and registers the IP address of the client 20 having tried to access during the failure of the monitored server 30 in the IP address table 71.

The server recovery detector 12 receives the SNMP trap message from the monitored server 30 at the SNMP manager 16 to detect the failure recovery of the monitored server based on the received message.

The server recovery notifier 13 gives the failure recovery notification of the server to the client 20 having tried to access based on the IP address table 71, triggered by the failure recovery of the monitored server 30 detected by the server recovery detector 12.

The SNMP manager 16 has a function of managing the SNMP agent with an SNMP protocol that is a network management protocol.

The SMTP mail transmitter 17 has a function of transmitting a mail with an SMTP (Simple Mail Transfer Protocol). A server 30_M in FIG. 3, as will be described later, is registered in the SMTP mail transmitter 17 as a mail server (SMTP server).

The interface 41 terminates a physical layer and a data link layer of a network signal, has a general ARP (Address Resolution Protocol) function for acquiring an MAC (Media Access Control) address and a general ICMP function for detecting/notifying a failure, and has an interface for notifying failure detection information to the server failure detector 11 of the server failure recovery notification device 100 according to the present invention.

The switch fabric 42 analyzes a header of a packet transmitted from the interface 41 to notify the information thereof to the route controller 43. Also, the switch fabric 42 switches each of the packets based on the instructions from the route controller 43.

The router controller 43, based on the information from the interface 41, determines a port to which the packet should be transmitted referring to a routing table (not shown).

Figures 3, 5:
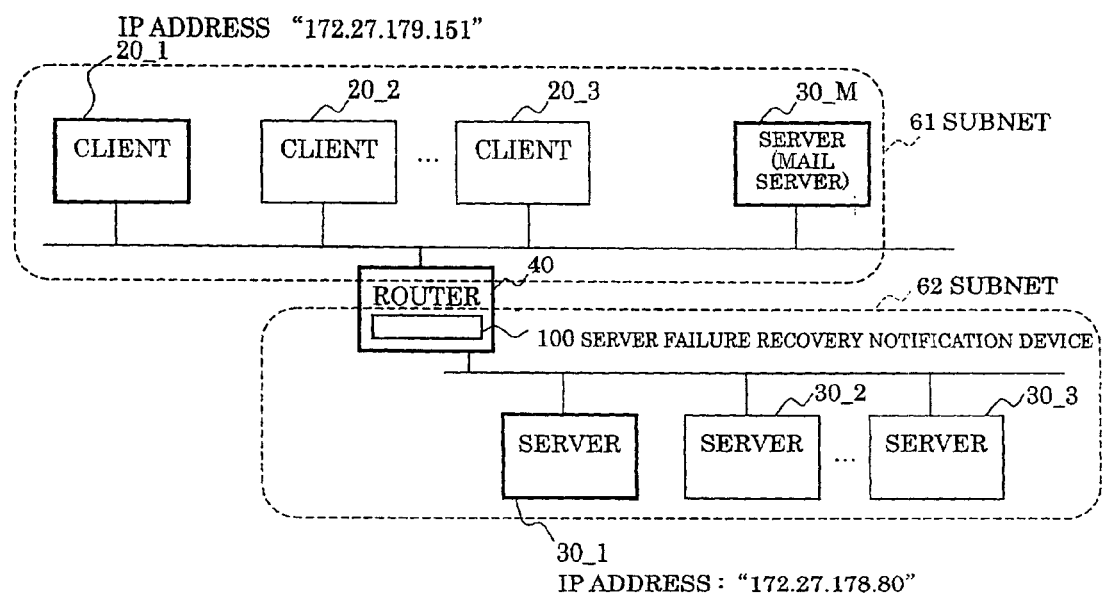
FIG. 3 is a block diagram showing a network arrangement to which embodiments (1) and (2) of a server failure recovery notification device according to the present invention are applied.
FIG. 5 is a diagram showing an example (1) of a client mail address table in a server failure recovery notification device according to the present invention.

FIG. 3 shows an arrangement of a network to which the server failure recovery notification device 100 shown in FIG. 2A is applied. The network is composed of subnets 61 and 62 connected with the router 40. Clients 20_1, 20_2, . . . , 20_3 (occasionally, represented by a reference numeral 20) and the server 30_M that is a mail server are mutually connected in the subnet 61. Servers 30_1, 30_2, . . . , 30_3 (occasionally, represented by a reference numeral 30) are mutually connected in the subnet 62.

In the network thus arranged, the packet which e.g. the client 20_1 has transmitted in order to access the server 30_1 is transmitted to the server 30_1 through the router 40.

FIG. 4A shows an arrangement of an IP address table 71 prepared by the server failure detector 11. This IP address table 71 is composed of tables 71a, 71b, and 71c. The table 71b stores the IP addresses of the clients having tried but failed to access each of the servers in a link form.

The table 71a associates "the IP address of the failed server" with "head link No. and end link No. in the server table 72b of the client" having tried to access the server.

The table 71c indicates "head link No. and end link No. of client IP address empty (free) area" of the table 71b.

It is to be noted that the table 71b may store a time when the IP address of the client has been registered as shown in the table 72b of FIG. 4B.

FIG. 5 shows a client mail address table 73 preset in the server failure recovery notification device 100. This table 73 stores the IP address of the client and the mail address of the operator of the client associated with each other. Based on this table 73, the mail address corresponding to the IP address can be retrieved.

Figure 6:
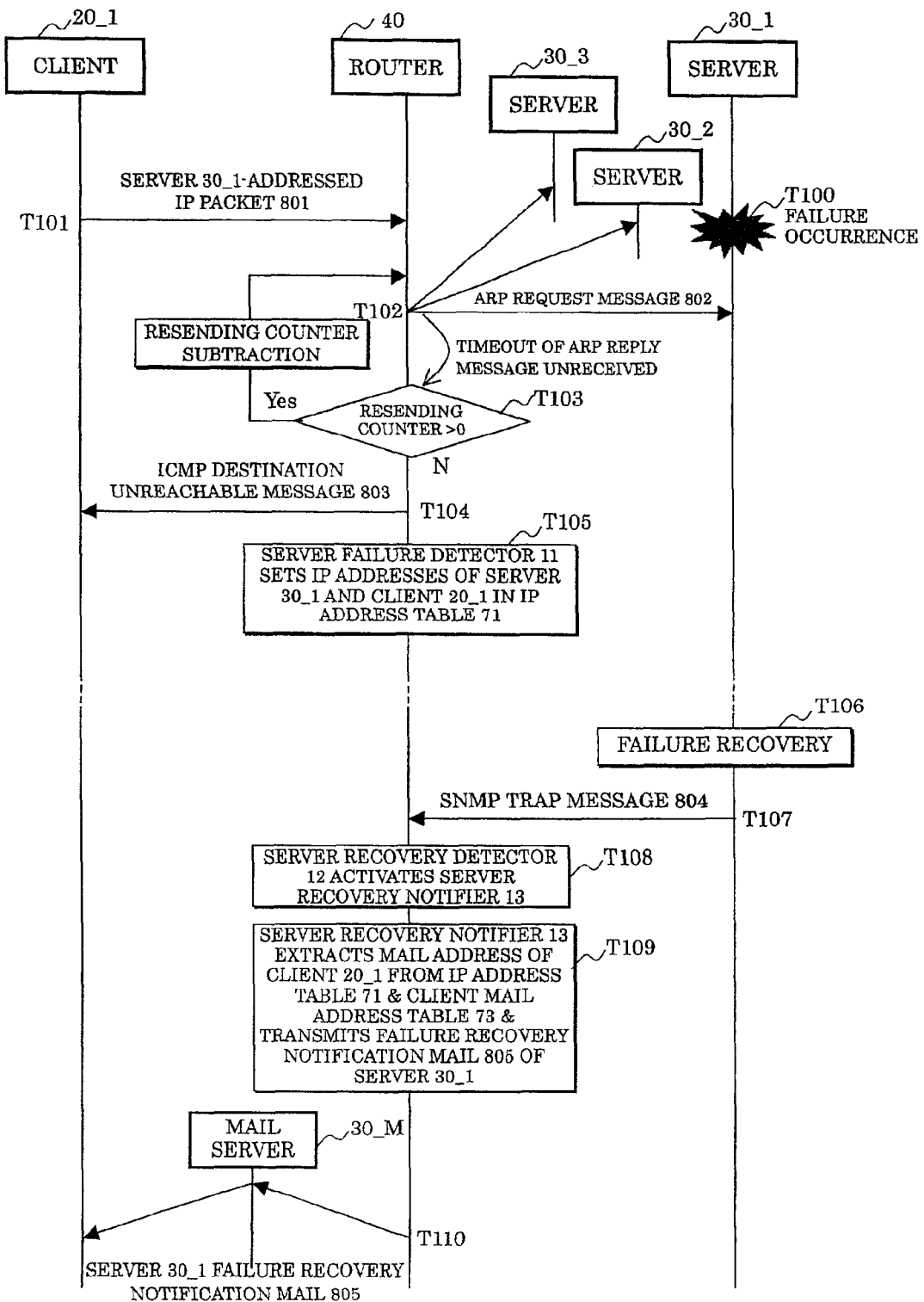
FIG. 6 is a sequence diagram showing a process procedure example of an embodiment (1) of a server failure recovery notification device according to the present invention.

FIG. 6 shows a process procedure example illustrating the operations of the client, the router, and the server in the embodiment (1) associated with each other.

Hereinafter, a procedure in which the client 20_1 has tried to access the server 30_1 in FIG. 3 will be described referring to the process procedure in FIG. 6.

Step T100: The server 30_1 can not be accessed due to a failure occurrence.

Step T101: The client 20_1 transmits an IP packet 801 in order to access the server 30_1.

FIG. 7A shows a header of the IP packet 801. The IP header includes "source IP address (="172.27.179.151")" and "destination IP address (="172.27.178.80")" of the IP packet. FIG. 7B shows a header of a TCP packet. This header will be described later.

Steps T102 and T103: The router 40 relaying the IP packet 801 transmits an ARP request message 802 for requesting an MAC address corresponding to the IP address of the server 30_1 to the subnet 62 (see FIG. 3) predetermined times. However, since the server 30_1 is being faulted, an ARP reply message is not be returned.

Step T104: The router 40 returns an ICMP destination unreachable message 803 to the client 20_1. The operator of the client 20_1 having received the message 803 recognizes that the server 30_1 is being faulted.

Since knowing that the mail of the failure recovery notification is transmitted when the server 30_1 has recovered, the operator does not repeat the access to the server 30_1 until the failure recovery notification is given.

Step T105: In the router 40, the server failure detector 11 registers the IP addresses of the server 30_1 (IP address="172.27.178.80") and the client 20_1 (IP address="172.27.179.151") in the IP address table 71 (see FIGS. 4A and 4B) in a link form.

Steps T106 and T107: The server 30_1 recovers from the failure. The SNMP agent 32 (see FIG. 2B) of the server 30_1 transmits an SNMP trap message 804 indicating the failure recovery to the router 40.

Step T108: In the router 40, the server recovery detector 12 receives the SNMP trap message 804 through the SNMP manager 16, and activates the server recovery notifier 13 triggered by this reception.

Step T109: The server recovery notifier 13 retrieves the IP address="172.27.179.151" of the client 20_1 having tried to access the failed server 30_1 based on the IP address table 71, and retrieves the mail address="Sato@xxx.yyy.co.jp" associated with the IP address from the client mail address table 73 (see FIG. 5). Then, the server recovery notifier 13 transmits a server failure recovery notification mail 805 to the retrieved mail address.

FIG. 8 shows a server failure recovery notification mail 805, which indicates a destination address="Sato@xxx.yyyco.jp" of the mail, a notification display of the server failure recovery, a name of the recovered server (IP address)="aaa.bbb.ccc.co.jp (172.27.178.80)", and a recovered time="yyyy/mm/dd HH/MM/SS".

Step T110: The operator of the client 20_1 receives the server failure recovery notification mail 805 through the mail server 30_M.

Thus, the operator of the client 20_1 can recognize the failure recovery of the server 30_1, and restart the access to the server 30_1.

Hereinafter, the operations of the interface 41, the server failure detector 11, the server recovery detector 12, and the server recovery notifier 13 will be described in more detail.

Figure 9:
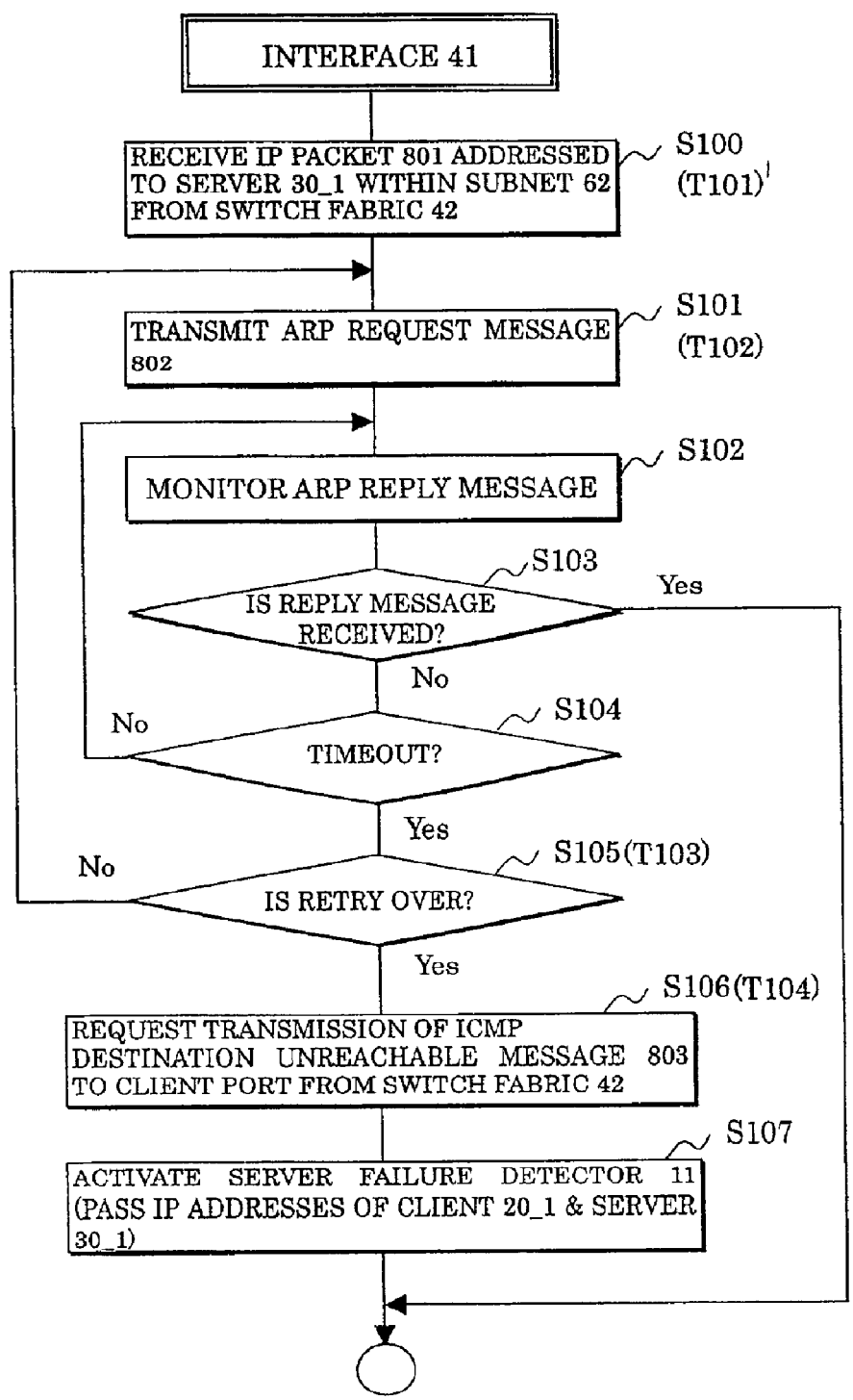
FIG. 9 is a flow chart showing a process flow example (1) of an interface in an embodiment (1) of a server failure recovery notification device according to the present invention.

FIG. 9 shows a process flow example in the interface 41 at the above-mentioned steps T101–T104.

Step S100: The interface 41 receives the IP packet 801 addressed to the server 30_1 within the subnet 62 (see FIG. 3) from the switch fabric 42 (see FIG. 2) (at step T101 in FIG. 6).

Steps S101 and S102: The interface 41 transmits the ARP request message 802 to the subnet 62 in order to obtain the MAC address of the destination server 30_1 of the IP packet 801, and monitors whether or not the ARP reply message that is a reply to the message 802 is returned.

Steps S103 and S104: When receiving this ARP reply message within a predetermined time, the interface 41 ends the process without doing anything. When not receiving the ARP reply message within a predetermined time, the interface 41 retransmits the ARP request message 802 (retries).

Steps S105 and S106: When the ARP reply message is not returned even if the interface 41 transmits the ARP reply message 802 more than a predetermined "request times", namely, when the server 30_1 is stopped due to some failure and unable to return the ARP reply message, the interface 41 requests the transmission of the destination unreachable message 803 addressed to the client 20_1 with the ICMP from the switch fabric 42.

As mentioned above, the technology of transmitting the destination unreachable message when the ARP reply message is not received has been previously known.

Step S107: Furthermore, the interface 41 activates the server failure detector 11, and passes the IP addresses of the client 20_1 and the server 30_1 to the server failure detector 11. Thus, the server failure detector 11 detects the client 20_1 having tried but failed to access the server 30_1.

Figure 10:
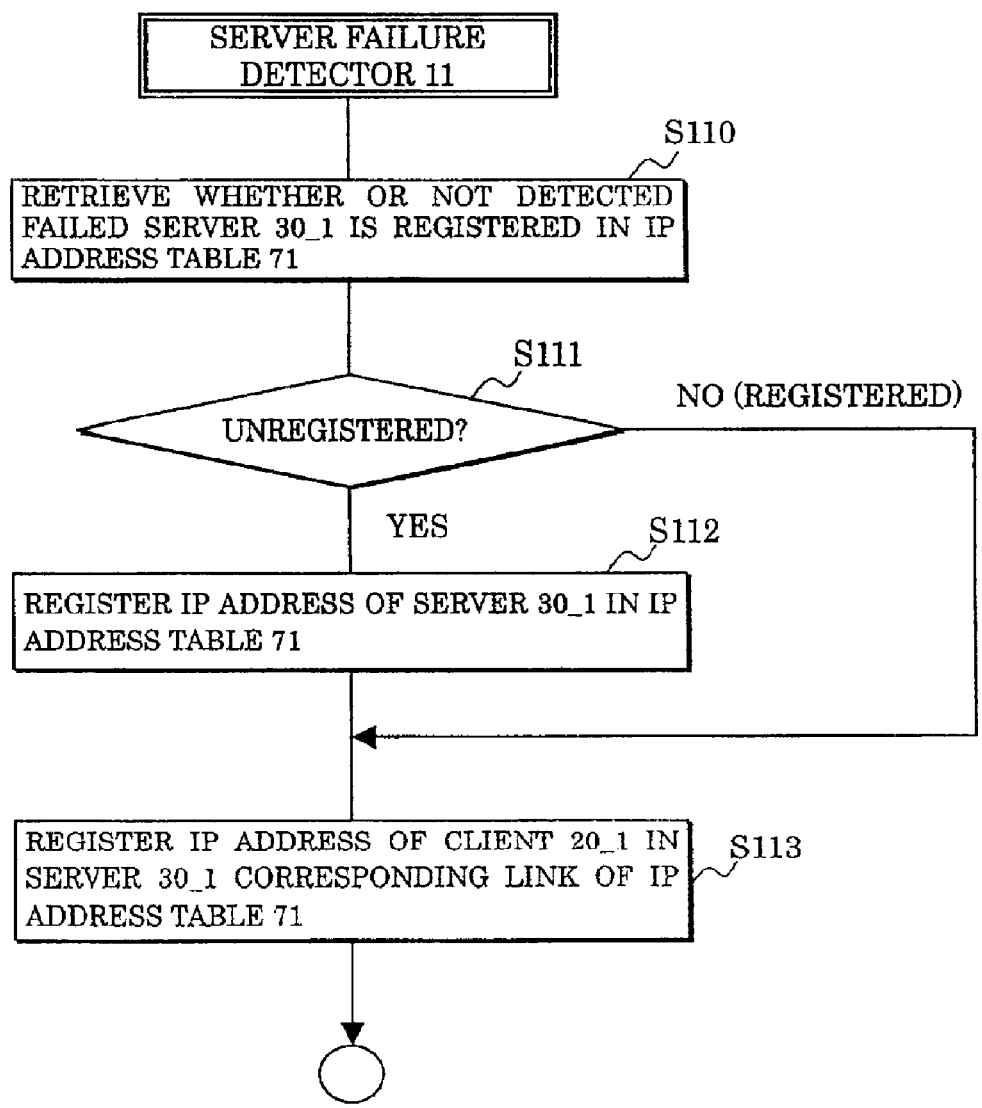
FIG. 10 is a flow chart showing a process flow example (1) of a server failure detector in an embodiment (1) of a server failure recovery notification device according to the present invention.

FIG. 10 shows an example (1) of an operation process flow of the server failure detector 11. Hereinafter, the operation of the server failure detector 11 will be described referring to FIG. 10.

Steps S110 and S111: The server failure detector 11, as shown at step S107 of the above-mentioned FIG. 9, receives the IP addresses of the client 20_1 and the server 30_1 from the interface 41.

The server failure detector 11 retrieves whether or not the IP address="172.27.178.80" of the server 30_1 in which a failure has occurred is registered in the table 71a within the IP address table 71. If it is the case, the process proceeds to step S113.

Step S112: If it is not the case, the server failure detector 11 registers the IP address of the server 30_1 in the table 71a, so that the process proceeds to step S113.

Step S113: The server failure detector 11 registers the IP address="172.27.179.151" of the client 20_1 linked with the IP address of the server 30_1 in the table 71b within the IP address table 71.

It is to be noted that when the IP address of the client 20_1 has already been registered, the address need not be registered.

Thus, the client 20_1 having tried but failed to access the server 30_1 has been associated with the server 30_1 to be registered in the IP address table 71.

Figure 11:
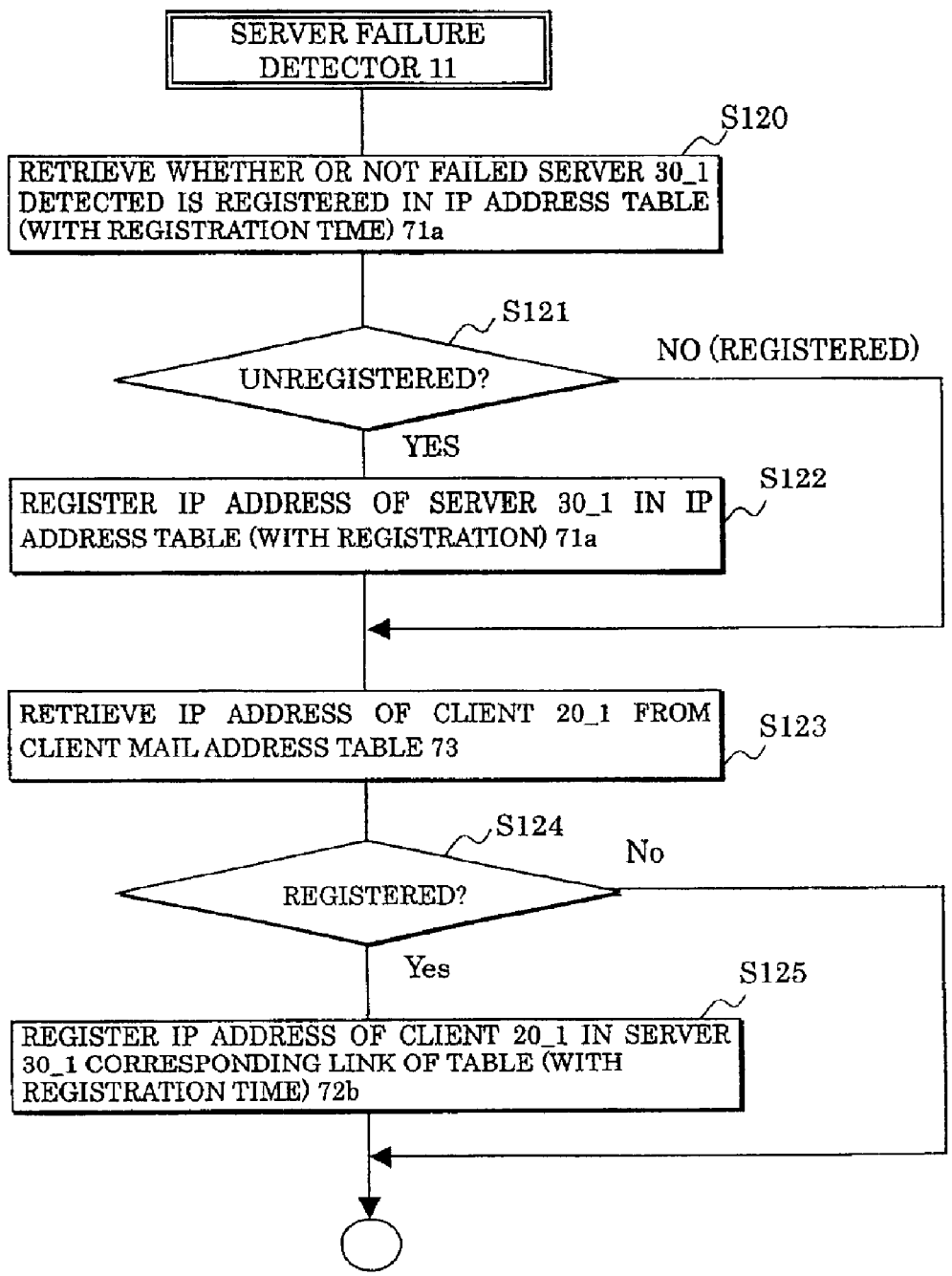
FIG. 11 is a flow chart showing a process flow example (2) of a server failure detector in an embodiment (1) of a server failure recovery notification device according to the present invention.

FIG. 11 shows an example (2) of an operation process flow of the server failure detector 11. This flow example (2), different from the flow example (1) shown in FIG. 10, shows a process flow in case where the table 72b to which the registration time is added is applied instead of the table 71b of the IP address table 71.

Also, in this process flow example (2), the client registered in the client mail address table 73 shown in FIG. 5 is registered in the IP address table 71.

Steps S120–S121: The server failure detector 11 receives the IP addresses of the client 20_1 and the server 30_1 from the interface 41, and retrieves whether or not the IP address="172.27.178.80" of the server 30_1 in which the failure has occurred is registered in the table 71a within the IP address table 71, so that if it is the case the process proceeds to step S123.

Step S122: If it is not the case, the server failure detector 11 registers the IP address of the server 30_1 in the table 71a, so that the process proceeds to step S123.

Steps S123 and S124: The server failure detector 11 retrieves whether or not the client 20_1 is registered in the client mail address table 73. If it is not the case, the server failure detector 11 ends the process without registering the client in the IP address table 71.

Step S125: Since the client 20_1 (IP address="172.27.179.151") is registered in the table 73, the server failure detector 11 registers the IP address of the client 20_1 and the registration time linked with the server 30_1 in the table 72b.

Thus, the client registered in the client mail address table 73 is registered in the IP address table 71, thereby enabling the failure recovery notification mail to be transmitted to e.g. the operator of the client requiring the server failure recovery notification, and eliminating the registration of unnecessary client in the IP address table 71.

Figure 12:
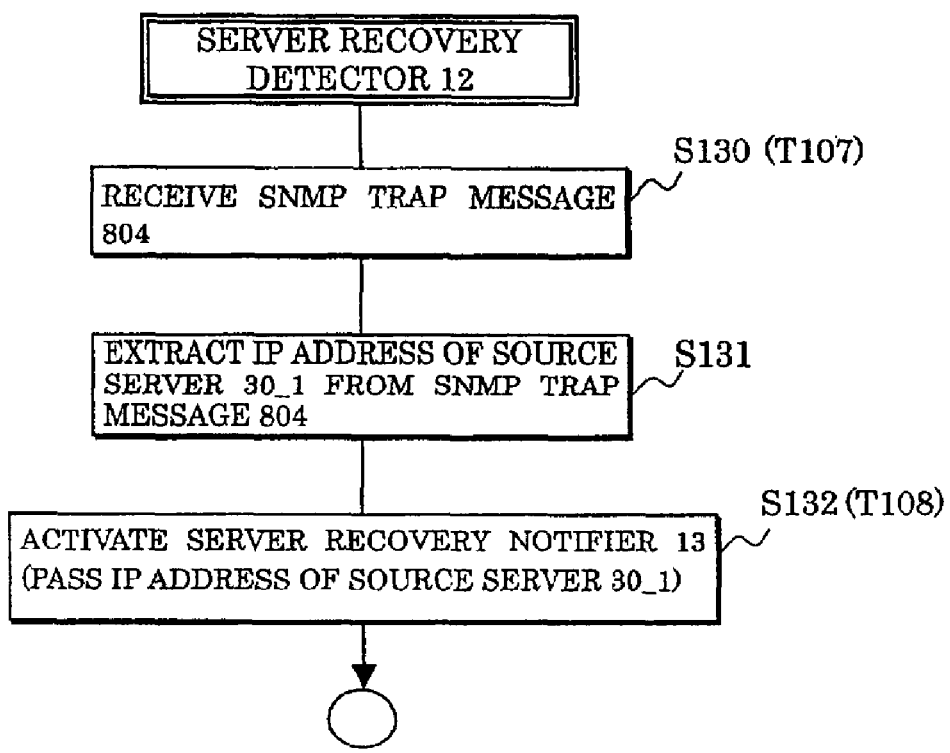
FIG. 12 is a flow chart showing a process flow example of a server recovery detector in an embodiment (1) of a server failure recovery notification device according to the present invention.

FIG. 12 shows an example of a detailed operation process flow of the server recovery detector 12 at steps T107 and T108 of the embodiment (1) shown in FIG. 6.

Step S130: The server recovery detector 12 receives the SNMP trap message 804 (see step T107 in FIG. 6).

Steps S131 and S132: The server recovery detector 12 extracts the IP address of the source server 30_1 from the SNMP trap message 804, activates the server recovery notifier 13, and passes the IP address of the server 30_1 to the server recovery notifier 13 (see step T108).

As a result, the server recovery detector 12 detects the failure recovery of the server 30_1, and notifies the server recovery notifier 13 that the failure of the server 30_1 has recovered.

Figure 13:
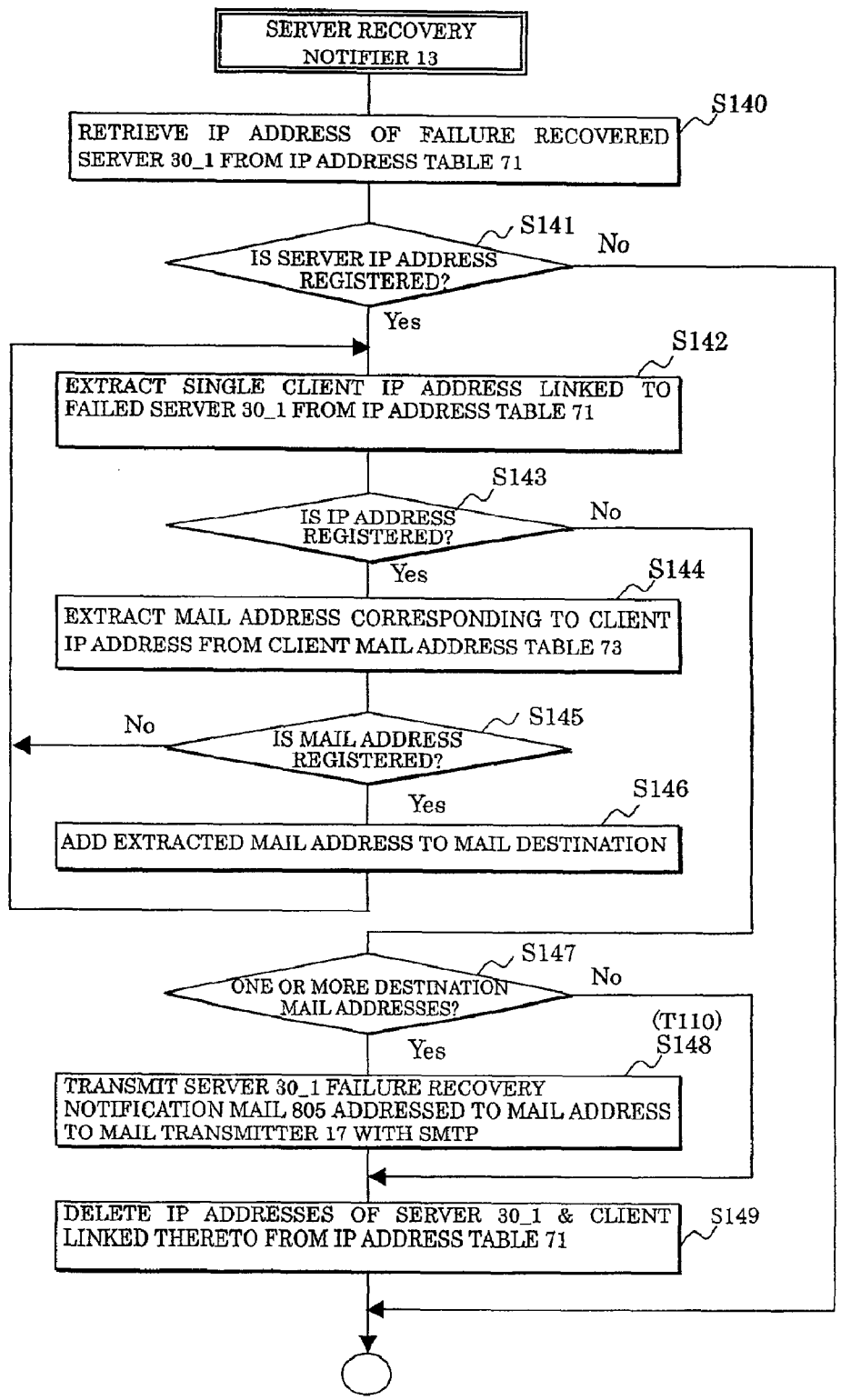
FIG. 13 is a flow chart showing a process flow example of a server recovery notifier in an embodiment (1) of a server failure recovery notification device according to the present invention.

FIG. 13 shows an example of a more detailed operation process flow of the server recovery notifier 13 at step T109 of the embodiment (1) shown in FIG. 6.

Steps S140 and S141: The server recovery notifier 13 retrieves whether or not the IP address of the failure recovered server 30_1 passed from the server recovery detector 14 at step S132 in FIG. 12 is registered in the table 71a within the IP address table 71 (see FIG. 4A). If it is not registered, the server recovery notifier 13 ends the process without doing anything.

Steps S142–S146: If the IP address of the server 30_1 is registered, the server recovery notifier 13 extracts the IP addresses of all the clients having linked with the server 30_1 and registered in the table 71b, and retrieves the mail addresses corresponding to the IP addresses from the client mail address table 73 (see FIG. 5) to be temporarily stored.

Steps S147 and S148: In the presence of the temporarily stored mail addresses, the server recovery notifier 13 passes the server failure recovery notification mail 805 (see FIG. 8) indicating that the server 30_1 has recovered and having the mail addresses to the SMTP mail transmitter 17, so that the process proceeds to the next step S149. In the absence of the temporarily stored mail addresses, the server recovery notifier 13 proceeds to next step S149 without doing anything.

Step S149: The server recovery notifier 13 deletes the IP addresses of the server 30_1 and the client linked therewith from the IP address table 71.

Thus, the server recovery notifier 13 can request the SMTP mail transmitter 17 to transmit the failure recovery notification mail addressed to the mail address registered in the client mail address table 73.

It is to be noted that when the difference is large between the time when the client 20_1 has tried to access the failed server 30_1 and the time when the failure of the server 30_1 has recovered, the recovery notification mail of the server 30_1 may assume a pointless notification for the operator of the client 20_1 even if it is transmitted to the client having requested the access by the server recovery notifier 13.

Therefore, the server recovery notifier 13 can perform a process not distributing the failure recovery notification to the client 20 whose registration time is prior to a failure recovery time by a predetermined time, referring to the IP address table 72b storing the registration time shown in FIG. 4B.

Alternatively, the server recovery notifier 13 may be periodically activated regardless of the failure recovery of the server 30_1, so that the IP address of the client 20 whose registration time in the IP address table 72b is prior thereto by a predetermined time or more may be deleted.

Figure 14:
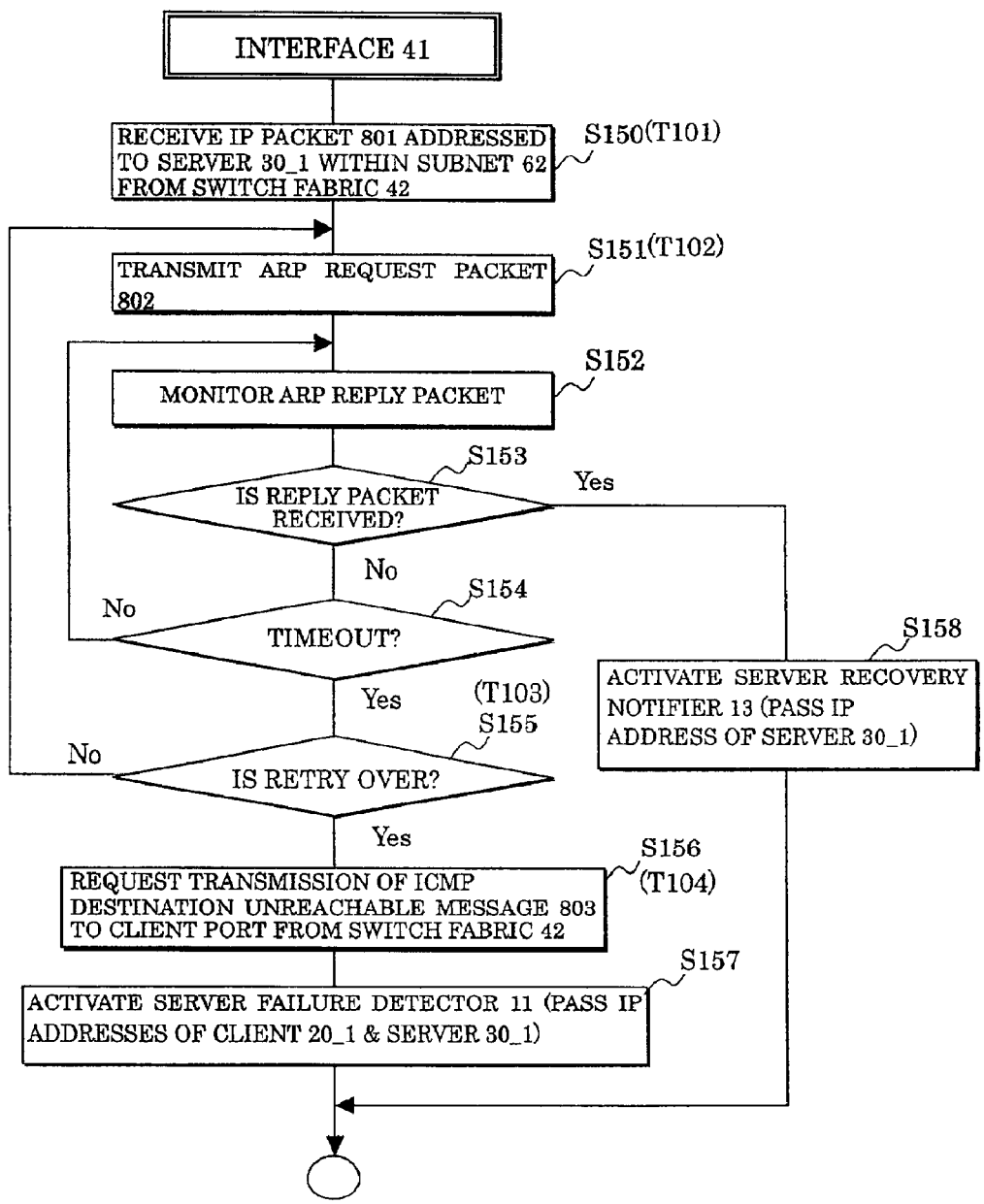
FIG. 14 is a flow chart showing a process flow example (2) of an interface in an embodiment (1) of a server failure recovery notification device according to the present invention.

It is to be noted that while the server recovery detector 12 recognizes the failure recovery of the server 30_1 by receiving the SNMP trap message 804 at steps T107 and T108 in FIG. 6 (or steps S130–S132 in FIG. 12) in this embodiment (1), the failure recovery of the server 30_1 can be detected as follows:

FIG. 14 shows a process flow example (2) of the interface 41. Steps S150–S157 of the process flow example (2) are the same as steps S100–S107 in the process flow example (1) of the interface 41 shown in FIG. 9 except that step S158 is added.

In this process flow (2), the interface 41 determines that the server 30_1 is not being faulted when receiving e.g. the ARP reply message from the server 30_1 at steps T102 and T103 of FIG. 6, and retrieves whether or not the IP address of the server 30_1 is registered in the IP address table 71 (see FIGS. 4A and 4B). If it is registered, namely if it is registered as failed, it is determined that the failure of the server 30_1 has recovered, so that the server recovery notifier 13 is activated and the IP address of the server 30_1 in which the failure has recovered is notified to the server recovery notifier 13 (see steps S153 and S158 in FIG. 14).

As mentioned above, according to the embodiment (1) of the present invention, it becomes possible to gives the failure recovery notification to the client 20 having tried but failed to access the failed server 30, when the failure of the server 30 has recovered.

[2] Embodiment (2): Server Failure Detection by ICMP Destination Unreachable Message and Failure Recovery Notification to Client Through Server FIG. 15A shows an embodiment (2) of the server failure recovery notification device 100 according to the present invention. This server failure recovery notification device 100 is added to the router 40 in the same way as the embodiment (1) shown in FIG. 2A, and operates in e.g. the network arrangement shown in FIG. 3 in the same way as the embodiment (1).

The arrangement of the server failure recovery notification device 100 is the same as that of the embodiment (1) except that a server mail address table 75 shown in FIG. 16 as will be described later is included instead of the client mail address table 73 shown in FIG. 2A.

Also, the SMTP mail transmitter 17 registering the server 30_M of FIG. 3 as a mail server is the same as the embodiment (1).

However, the server recovery notifier 13, different from the embodiment (1), does not directly give the failure recovery notification of the server 30 to the client 20 having tried to access, but requests the server 30 in which the failure has recovered to distribute the failure recovery notification addressed to the client 20 having tried to access.

FIG. 15B shows an arrangement of the server 30 corresponding to the server failure recovery notification device 100 of the embodiment (2). This server 30 is provided with a recovery notification mail transmitter 31, an SNMP agent 32, an SMTP mail transmitter 33, a POP mail receiver 34, and a client mail address table 35.

In the SNMP agent 32, the SNMP manager 16 of the server failure recovery notification device 100 is registered as a SNMP manager.

The POP mail receiver 34 receives the contents of a mail spool by using a POP (Post Office Protocol) protocol and a TCP/IP protocol from the mail server 30_M spooling an e-mail.

The server 30_M shown in FIG. 3 is preliminarily registered in the server 30 as a mail server.

The client mail address table 35 is the same as the client mail address table 73 shown in FIG. 5.

FIG. 16 shows an example of a server mail address table 75 included in the server failure recovery notification device 100. This table 75 associates the IP addresses of the servers 30_1–30_3 with the mail addresses of the recovery notification mail transmitter 31 within the server 30.

Figure 17:
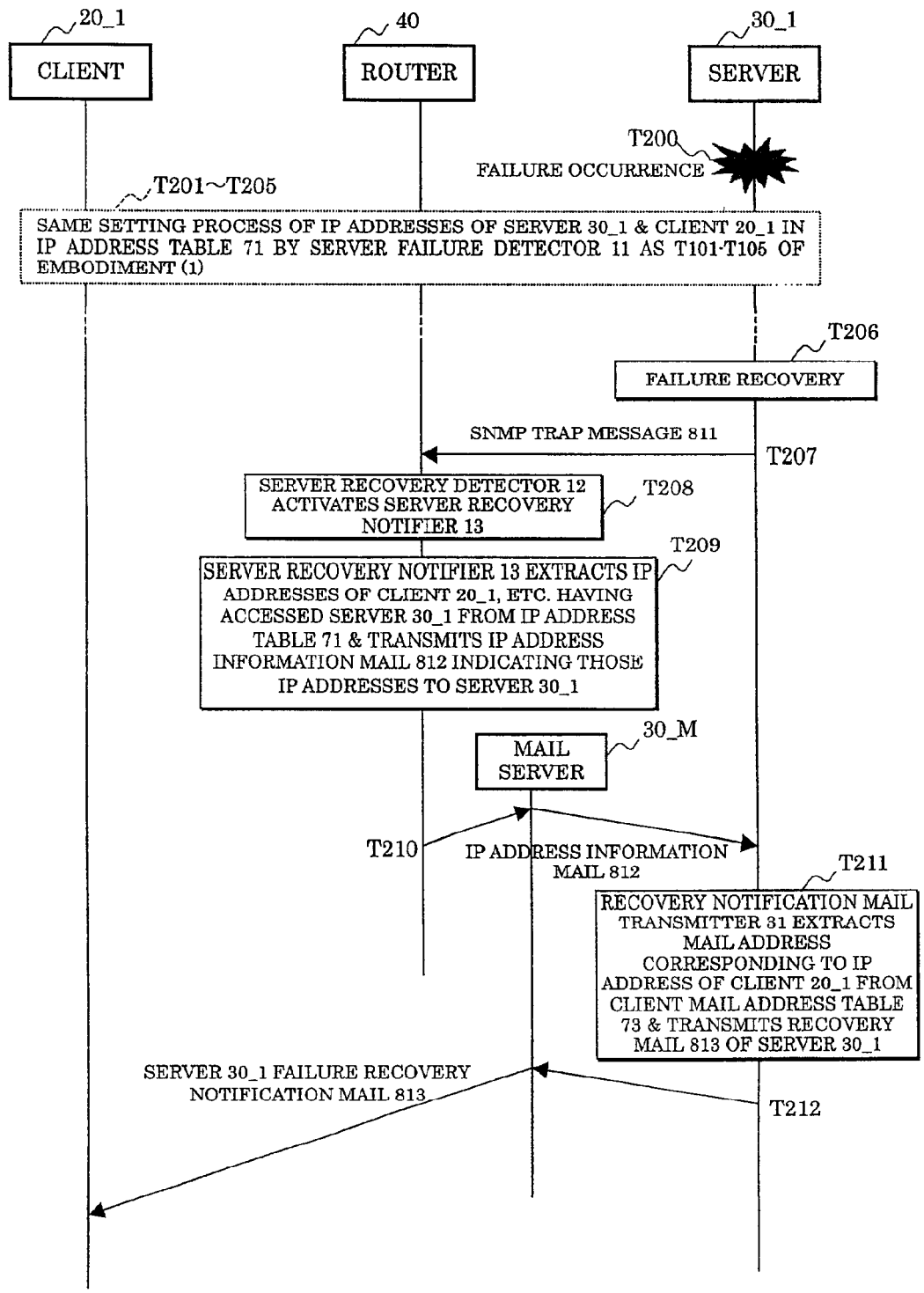
FIG. 17 is a sequence diagram showing a process procedure example of an embodiment (2) of a server failure recovery notification device according to the present invention.

FIG. 17 shows a process procedure example of the embodiment (2) according to the present invention. In this process procedure example, the server failure recovery notification device 100 requests the server 30 in which the failure has recovered to transmit a server failure recovery notification mail 813 to the mail address corresponding to the client 20 having tried but failed to access the failed server 30.

Hereinafter, the operation example in which the client 20_1 accesses the server 30_1 through the router 40 in the network shown in FIG. 3 will be described referring to the process procedure example of FIG. 17.

Step T200: The failure occurs in the server 30_1.

Steps T201–T205: Since the ARP reply message from the server 30_1 is not received when the client 20_1 accesses the server 30_1, the router 40 recognizes the failure of the server 30_1, and the server failure detector 11 registers the server 30_1 and client 20_1 in the IP address table 71 in the same way as steps T101–T105 of the embodiment (1) in FIG. 6.

Steps T206–T207: The failure of the server 30_1 has recovered, so that the SNMP agent 32 of the server 30_1 transmits an SNMP trap message 811 indicating the failure recovery of the server 30_1.

Step T208: In the router 40, the server recovery detector 12 of the server recovery notification device 100 receives the SNMP trap message 811, and recognizes that the failure of the server 30_1 has recovered to activate the server recovery notifier 13.

The above-mentioned steps T206–T208 are the same as steps T106–T108 of embodiment (1).

Step T209: The server recovery notifier 13 extracts "record composed of IP address of the recovered server 30_1 and IP address of e.g. the client 20_1 having linked therewith" referring to the IP address table 71 shown in FIGS. 4A and 4B, and deletes the record from the IP address table 71.

Furthermore, the server recovery notifier 13 extracts, from the server mail address table 75 shown in FIG. 16, the mail address corresponding to the IP address of the server 30_1 in which the failure has recovered, namely the mail address corresponding to the recovery notification mail transmitter 31 of the server 30_1 in which the failure has recovered, and passes the mail address and the record extracted from FIGS. 4A and 4B to the SMTP mail transmitter 17.

Step T210: The SMTP mail transmitter 17 prepares a recovery notifying destination IP address information mail 812 composed of the record, and treats the destination address of the mail 812 as a mail address of the recovery notification mail transmitter 31. The SMTP mail transmitter 17 transmits the mail 812 to the mail server 30_M.

FIG. 18 shows an example of the recovery notifying destination IP address information mail 812. This mail 812 is composed of a server IP address="172.27.178.80", client IP addresses having linked to the server IP address= "172.27.179.151", "172.27.179.153", "172.27.179.157", and "172.27.179.161".

Step T211: In the server 30_1, the POP mail receiver 34 accesses the mail server 30_M to acknowledge that the mail addressed to the recovery notification mail transmitter 31 is spooled. If it is spooled, the POP mail receiver 34 receives the mail, activates the recovery notification mail transmitter 31, and passes the contents of the received mail to the recovery notification mail transmitter 31.

The recovery notification mail transmitter 31 extracts the mail address corresponding to the client IP address described in the mail from the client mail address table 73.

When the corresponding mail address is registered, the failure recovery notification mail (see FIG. 8) indicating that the failure of the server 30_1 has recovered is generated to be passed to the SMTP mail transmitter 33, which transmits the notification mail to the extracted mail address.

Thus, it becomes possible for the server 30_1 to transmit the failure recovery notification mail of the server 30_1 to the mail address corresponding to the client 20 having tried to access the failed server 30_1 itself.

It is to be noted that in the embodiment (2) the POP mail receiver 34 periodically accesses the mail server 30_M and activates the recovery notification mail transmitter 31 triggered by a mail reception, while in the server 30_1 the POP mail receiver 34 may access the mail server 30_M when the failure of the server itself has recovered.

Hereinafter, a detailed process procedure of the server recovery notifier 13 (see FIG. 15) and the recovery notification mail transmitter 31 in the embodiment (2) shown in FIG. 17 will be described.

Figure 19:
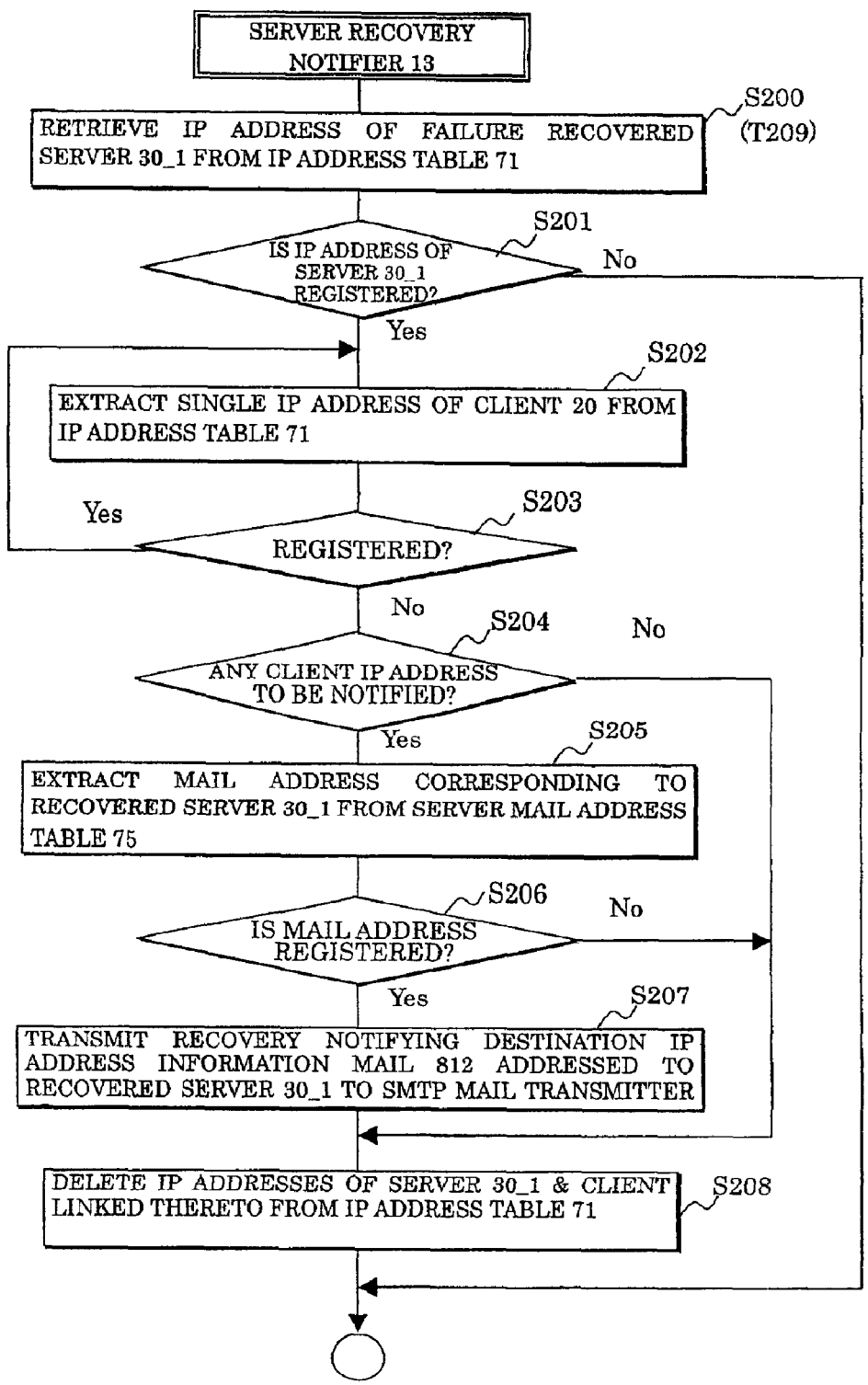
FIG. 19 is a flow chart showing a process flow example of a server recovery detector in an embodiment (2) of a server failure recovery notification device according to the present invention.

FIG. 19 shows a more detailed process flow example of the server recovery notifier 13 at step T209 of the embodiment (2).

Steps S200 and S201: The server recovery notifier 13 retrieves whether or not the IP address of the server 30_1 in which the failure has recovered is registered in the IP address table 71. If it is not registered, the server recovery notifier 13 ends the process without doing anything.

Steps S202 and S203: If it is registered, the notifier 13 extracts the IP addresses of all the registered clients, e.g. the clients 20_1, having linked with the IP address of the server 30_1 from the IP address table 71, and prepares the recovery notifying destination IP address information mail 812.

Steps S204 and S205: In the absence of the IP address of the client 20 extracted (to which the failure recovery should be notified), the process proceeds to step S208. In the presence of the IP address of the client 20, the notifier 13 extracts the mail address corresponding to the recovered server 30_1 from the server mail address table 75.

Step S206: If the mail address is not registered, the notifier 13 proceeds to step S208.

Step S207: If the mail address is registered, the notifier 13 passes the recovery notifying destination IP address information mail 812 (see FIG. 18) addressed to the server 30_1 to the SMTP mail transmitter 17.

Step S208: The notifier 13 deletes the IP addresses of the server 30_1 and the client linked therewith from the IP address table 71.

Thus, the notifier 13 requests the SMTP mail transmitter 17 to notify, to the server 30_1, the IP addresses of all of the clients having tried to access the failed server 30_1 with the recovery notifying destination IP address information mail 812 when the server 30_1 is registered in the server mail address table 75.

Figure 20:
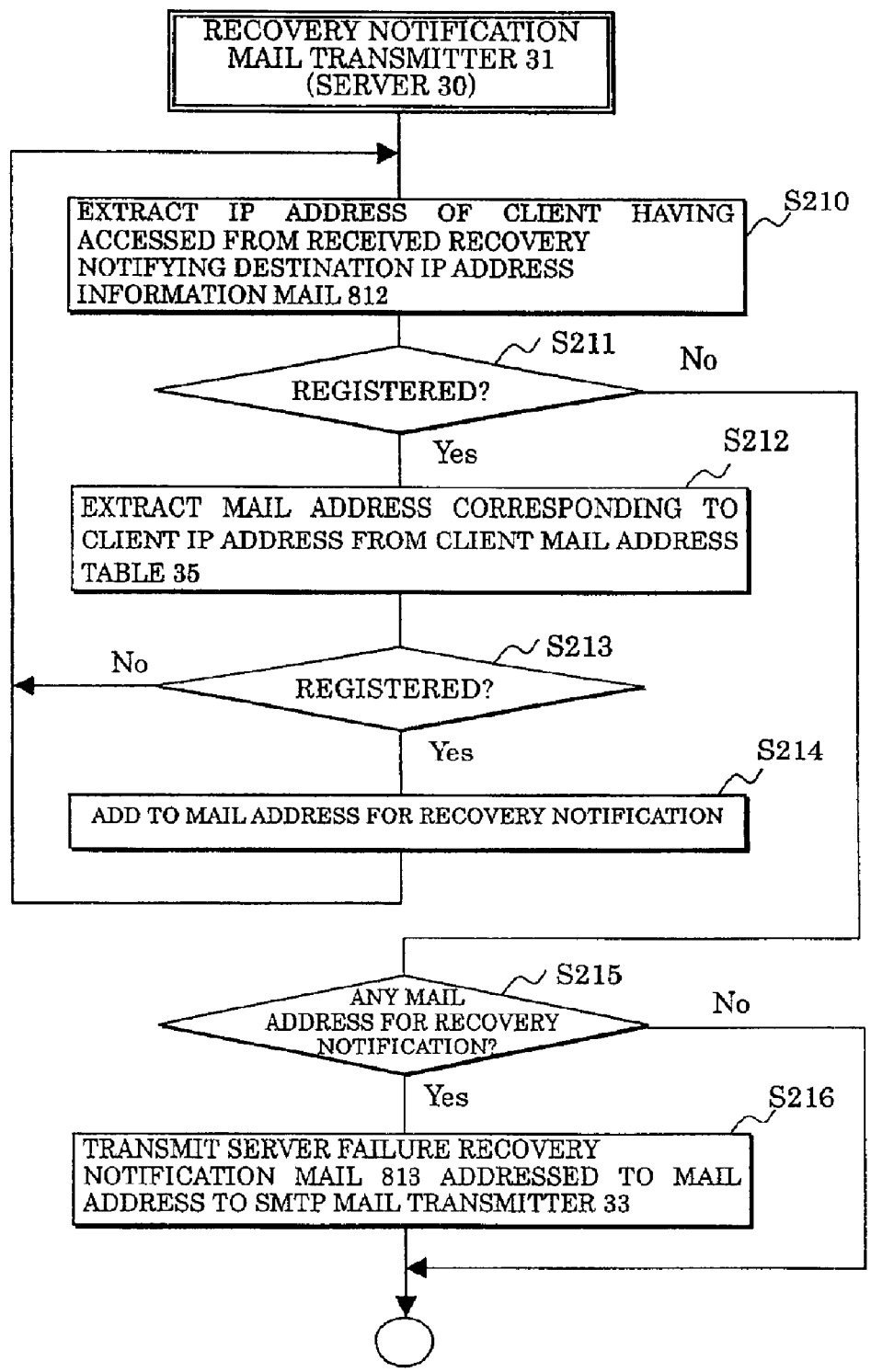
FIG. 20 is a flow chart showing a process flow example of a recovery notification mail transmitter in an embodiment (2) of a server failure recovery notification device according to the present invention.

FIG. 20 shows a more detailed process flow example of the recovery notification mail transmitter 31 at step T211 of the embodiment (2).

Steps S210–S214: The recovery notification mail transmitter 31 extracts the IP address of client 20 having accessed the server 30_1 from the received recovery notifying destination IP address information mail 812, and retrieves whether or not the IP address is registered in the client mail address table 35. If it is registered ("yes" at step S213), the transmitter 31 adds the mail address corresponding to the IP address to the mail address for recovery notification referring to the table 35. If it is not registered, the process returns to step S210.

Step S211: When there is no more IP address of the client to be extracted from the mail 812, the transmitter 31 proceeds to step S215.

Steps S215 and S216: In the absence of the address for recovery notification, the transmitter 31 ends the process. In the presence of the address for recovery notification, the transmitter 31 passes the server failure recovery notification mail 813 addressed to the mail address (mail address for recovery notification) to the SMTP mail transmitter 33.

Thus, in the server 30_1, the recovery notification mail transmitter 31 transmits the mail 813 indicating that the failure of the server 30_1 itself has recovered to the mail address corresponding to the client 20 registered in the client mail address table 35 among the clients 20 having tried to access the server 30_1 for the failure occurrence through the SMTP mail transmitter 33.

[3] Embodiment (3): Server Failure Detection by ICMP Destination Unreachable Message, and Failure Recovery Notification to Client Through Network Management Apparatus The arrangement of the server failure recovery notification device 100 in the embodiment (3) is the same as that of the embodiment (2) shown in FIG. 15A.

Figure 21:
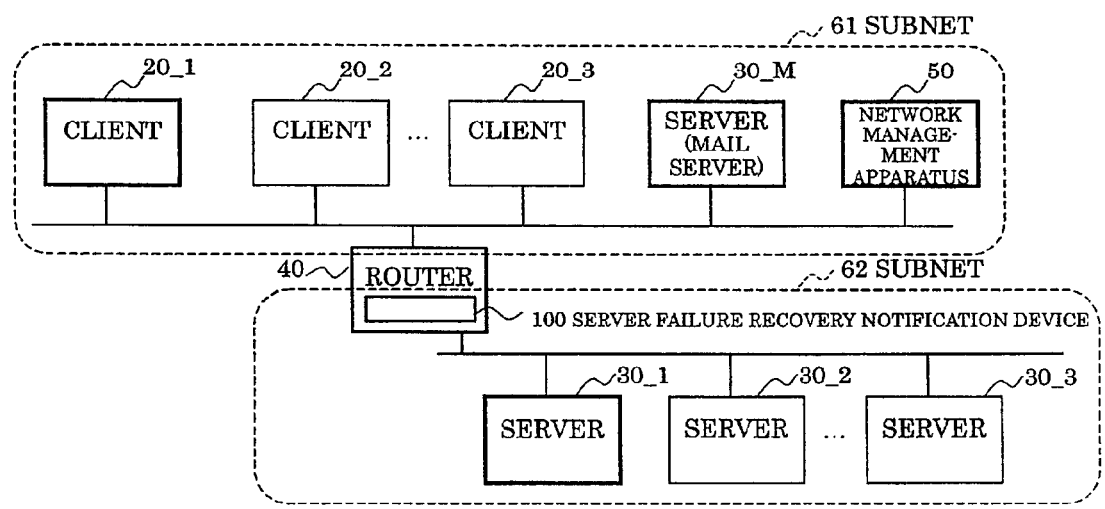
FIG. 21 is a diagram showing a network arrangement in which an embodiment (3) of a server failure recovery notification device according to the present invention is applied.

FIG. 21 shows an arrangement of a network to which the server failure recovery notification device 100 of the embodiment (3) is applied. This network arrangement is the same as that shown in FIG. 3 except that the network management apparatus 50 is connected to the subnet 61.

In the embodiment (3), different from the embodiment (2), the server recovery notifier 13 of the server failure recovery notification device 100 does not request the server 30 itself where the failure has recovered to distribute the failure recovery notification mail, but requests the network management apparatus 50 to distribute the failure recovery notification mail.

Figure 22:
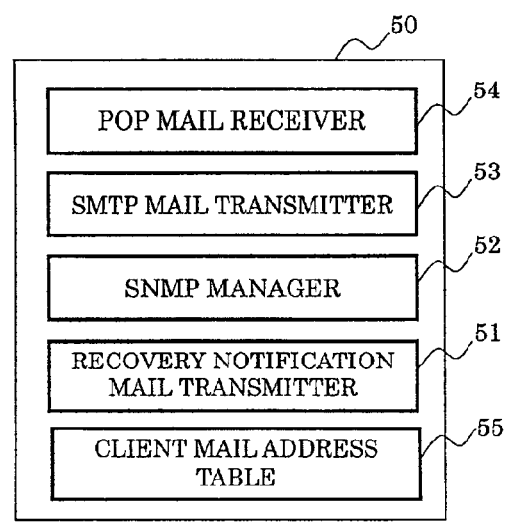
FIG. 22 is a block diagram showing an embodiment of a network management apparatus in an embodiment (3) of a server failure recovery notification device according to the present invention.

FIG. 22 shows an arrangement of a network management apparatus 50. This network management apparatus 50 is composed of a recovery notification mail transmitter 51, an SNMP manager 52, an SMTP mail transmitter 53, a POP mail receiver 54, and a client mail address table 55. This table 55 is the same as the table 73 shown in FIG. 5.

Also, the server 30_M is preliminarily registered as a mail server in the network management apparatus 50.

The IP address of the network management apparatus 50 and the mail address of the recovery notification mail transmitter 51 are preliminarily associated with each other to be set in the server mail address table 75 of the server failure recovery notification device 100.

The IP address of the client and the mail address of its operator are preliminarily associated with each other to be set in the table 55 of the network management apparatus 50.

Figure 23:
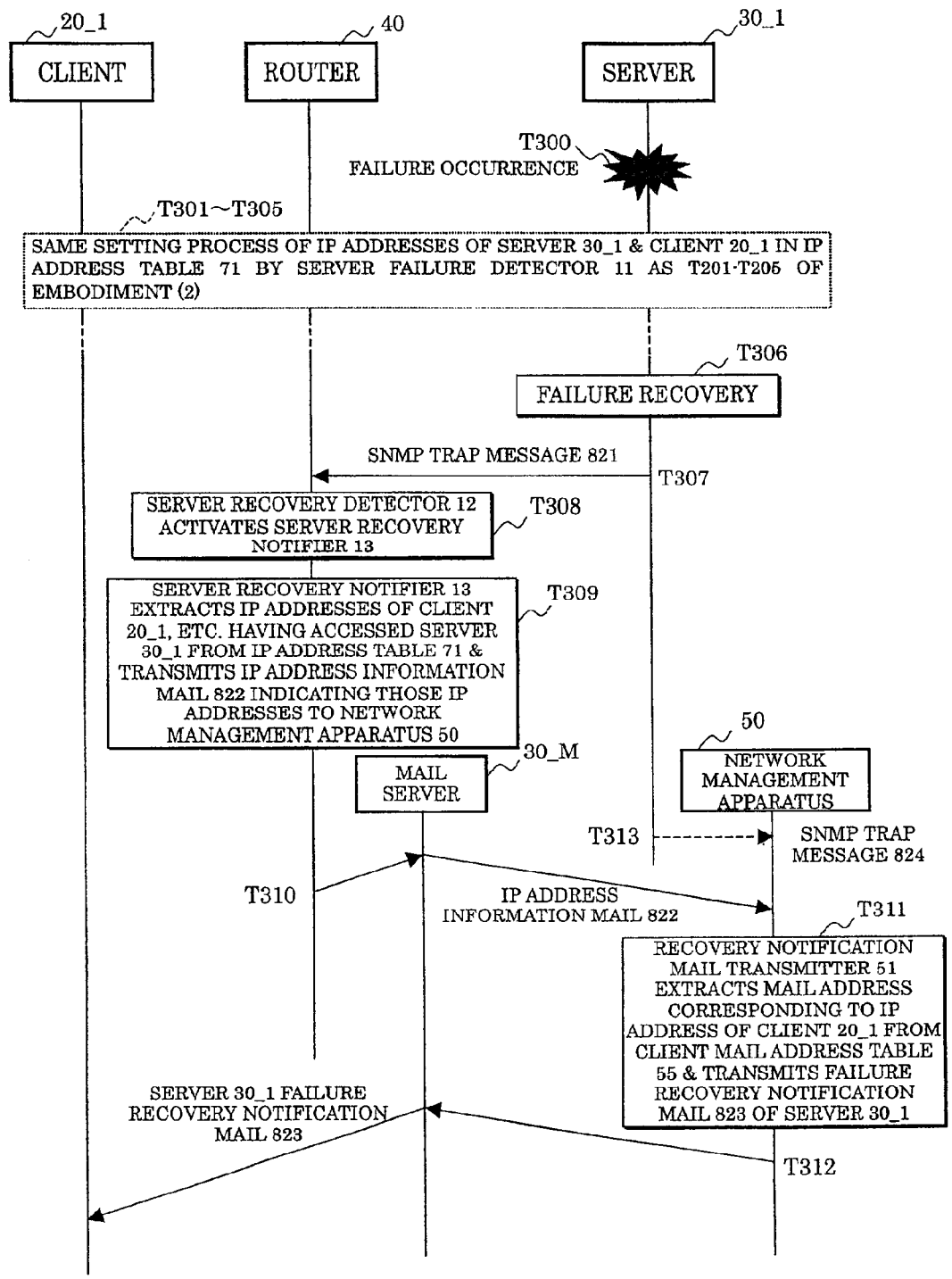
FIG. 23 is a sequence diagram showing a process procedure example of an embodiment (3) of a server failure recovery notification device according to the present invention.

FIG. 23 shows a process procedure example in the embodiment (3) according to the present invention, and in this embodiment (3), the server failure recovery notification device 100 requests the network management apparatus 50 to transmit the server failure recovery notification mail to the mail address corresponding to the client 20 having tried but failed to access the failed server 30.

Hereinafter, an operation example in which the client 20_1 accesses the server 30_1 through the router 40 in the network arrangement shown in FIG. 21 referring to the process procedure example of FIG. 23.

Step T300: A failure occurs in the server 30_1.

Steps T301–T305: These steps are the same as steps T201–T205 of the embodiment (2) in FIG. 17.

Steps T306–T308: An SNMP trap message 821 indicating that the failure of the server 30_1 has recovered is transmitted, from the server 30_1, to the SNMP manager 16 of the server failure recovery notification device 100, whereby the server recovery detector 12 recognizes the failure recovery of the server 30_1 to activate the server recovery notifier 13. The above-mentioned operations are the same as steps T206–T208 of the embodiment (2).

Steps T309 and T310: The server recovery notifier 13 extracts the IP addresses of the clients 20_1, etc. having tried but failed to access the server 30_1 from the IP address table 71.

The notifier 13 transmits the recovery notifying destination IP address information mail 822 indicating the IP addresses to the mail address corresponding to the network management apparatus 50, obtained referring to the server mail address table 75. The arrangement of the mail 822 is the same as that of the mail 812 shown in FIG. 18.

Steps T311 and T312: In the network management apparatus 50, the POP mail receiver 54 periodically accesses the mail server 30_M, receives the mail 822 addressed to the recovery notification mail transmitter 51 when it is spooled, and then activates the recovery notification mail transmitter 51.

It is to be noted that instead of making the POP mail receiver 54 periodically access the mail server 30_M to receive the mail, the following method may be possible: The server 30_1, as shown at steps T313, transmits an SNMP trap message 824 indicating the failure recovery of the server 30_1 itself to the SNMP manager 52 of the network management apparatus 50, so that the POP mail receiver 54, triggered by the SNMP trap message 824, accesses the mail server 30_M and receives the mail 822.

In this case, it is required to register the SNMP manager 52 of the network management apparatus in the SNMP agent 32 of the server 30 as an SNMP manager.

The recovery notification mail transmitter 51 extracts the mail address corresponding to the IP addresses of the clients 20_1, etc. indicated in the mail 822 referring to the client mail address table 55 (see FIG. 5), and transmits, to this mail address, a server failure recovery notification mail 823 indicating that the failure of the server 30_1 has recovered.

Thus, it becomes possible to notify that the failure of the server 30_1 has recovered to the operators of the clients 20_1, etc. having tried to assess the failed server 30_1.

Figure 24:
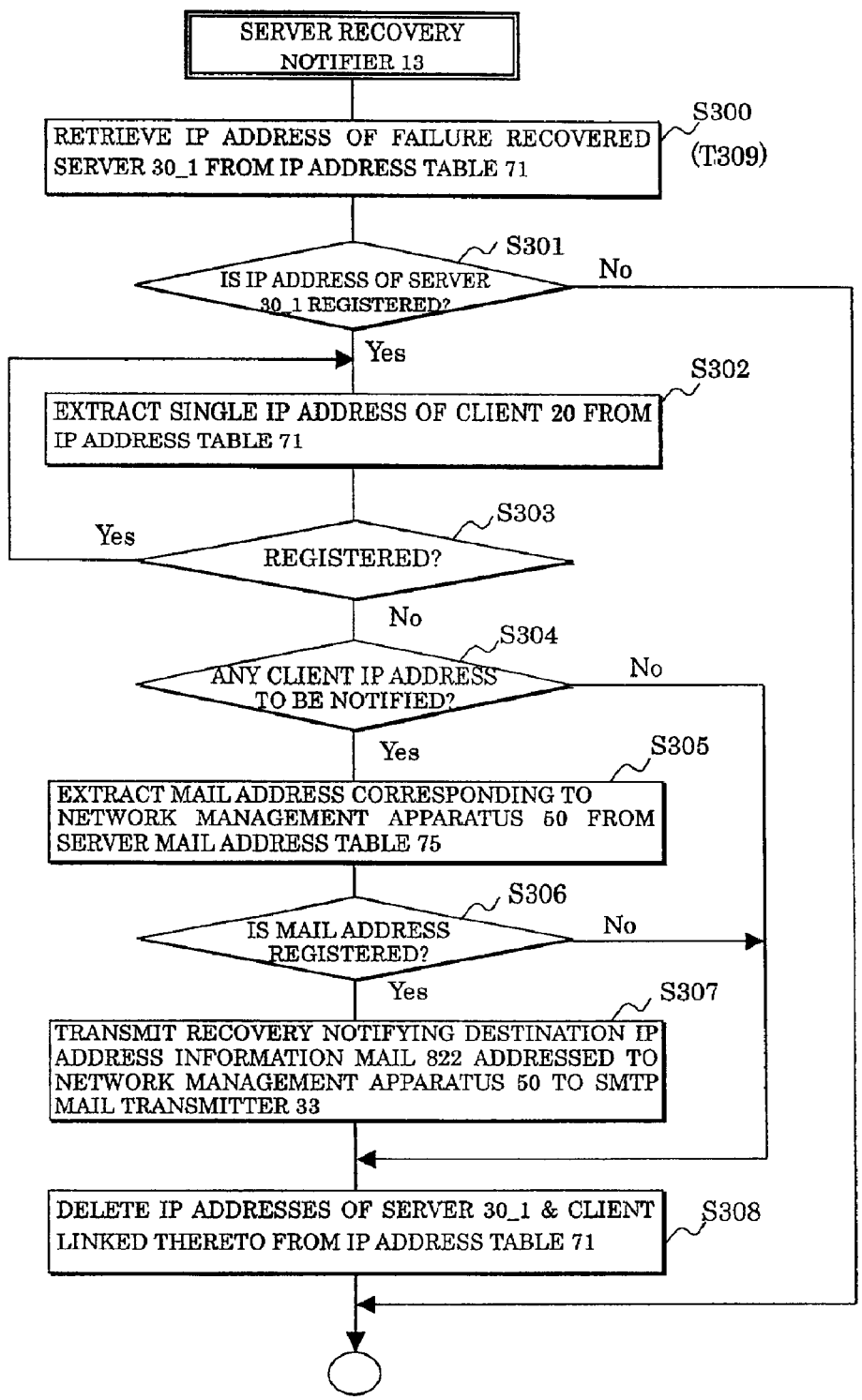
FIG. 24 is a flow chart showing a process flow example of a server recovery detector in an embodiment (3) of a server failure recovery notification device according to the present invention.

FIG. 24 shows a more detailed process flow example of the server recovery notifier 13 at step T309 of FIG. 23.

Steps S300–S303: The notifier 13 extracts the IP addresses of all the clients 20 to which the failure recovery of server 30_1 should be notified from the IP address table 71. The operation of the notifier 13 is the same as that of the server recovery notifier 13 at steps S200–S203 in the embodiment (2) shown in FIG. 19.

Steps S304 and S305: In the absence of the IP address of the client 20 extracted (to which the failure recovery should be notified), the notifier 13 proceeds to step S308. In the presence of the IP address of the client 20, the notifier 13 extracts the mail address corresponding to the recovery notification mail transmitter 51 of the network management apparatus 50 from the server mail address table 75.

Step S306: If the mail address is not registered, the notifier 13 proceeds to step S308.

Steps S306 and S307: If the mail address is registered, the notifier 13 prepares the recovery notifying destination IP address information mail 822 indicating the extracted IP address, and requests the SMTP mail transmitter 17 to transmit the mail 822 to the mail address. It is to be noted that the recovery notifying destination IP address information mail 822 is the same as the recovery notifying destination IP address information mail 812 shown in FIG. 18.

Step S308: The notifier 13 deletes the IP addresses of the server 30_1 and the client having linked therewith from the IP address table 71.

Thus, when the mail address of the recovery notification mail transmitter 51 is registered in the server mail address table 75, the notifier 13 requests the SMTP mail transmitter 17 to notify the IP address of the client having tried to access the failed server 30_1 to the recovery notification mail transmitter 51 with the recovery notifying destination IP address information mail 822.

Figure 25:
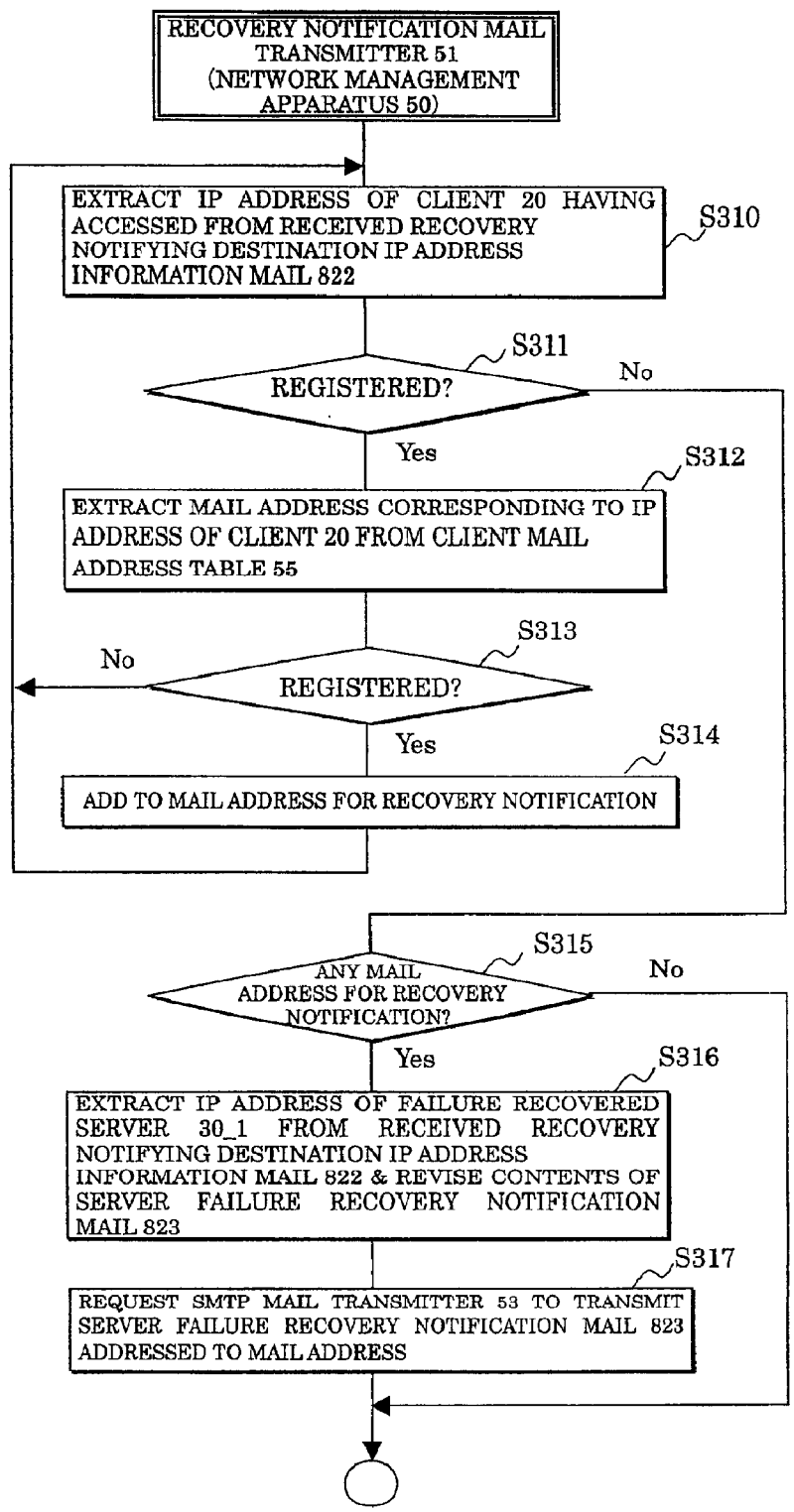
FIG. 25 is a flow chart showing a process flow example of a recovery notification mail transmitter in an embodiment (3) of a server failure recovery notification device according to the present invention.

FIG. 25 shows a more detailed process flow example of the recovery notification mail transmitter 51 of the network management apparatus 50 at step T311 of FIG. 23.

Steps S310–S314: The recovery notification mail transmitter 51 extracts the IP addresses of all of the clients 20 having tried to access the failed server 30_1 from the received recovery notifying destination IP address information mail 822.

The transmitter 51 extracts the mail address corresponding to the IP address registered in the client mail address table 55 (see FIG. 5) within the extracted IP addresses from the table 55 to be treated as a mail address for recovery notification.

The above-mentioned operations are the same as those of steps S210–S214 at the recovery notification mail transmitter 31 of the server 30_1 in the embodiment (2) shown in FIG. 20.

Steps S315–S317: In the absence of the mail address for recovery notification, the transmitter 51 ends the process, while in the presence of the mail address for recovery notification, the transmitter 51 extracts the IP address of the server 30_1 in which the failure has recovered from the recovery notifying destination IP address information mail 822 (see FIG. 18).

Furthermore, the transmitter 51 inquires a DNS (Domain Name System) server to retrieve "host name" from "IP address of server 30_1". The transmitter 51 enters this "host name" in "recovery server name field" within the contents of the server failure recovery notification mail 823 (see FIG. 8). When the "host name" can not be retrieved, the transmitter 51 enters "IP address of server 30_1" in the "recovery server name field".

The transmitter 51 requests the SMTP mail transmitter 53 to transmit the server failure recovery notification mail 823 to the mail address for recovery notification.

Thus, when the client 20 having tried to access the failed server 30_1 is registered in the client mail address table 55, the server failure recovery notification mail 823 is transmitted to the operator of the registered client 20 from the network management apparatus 50.

Figure 26:
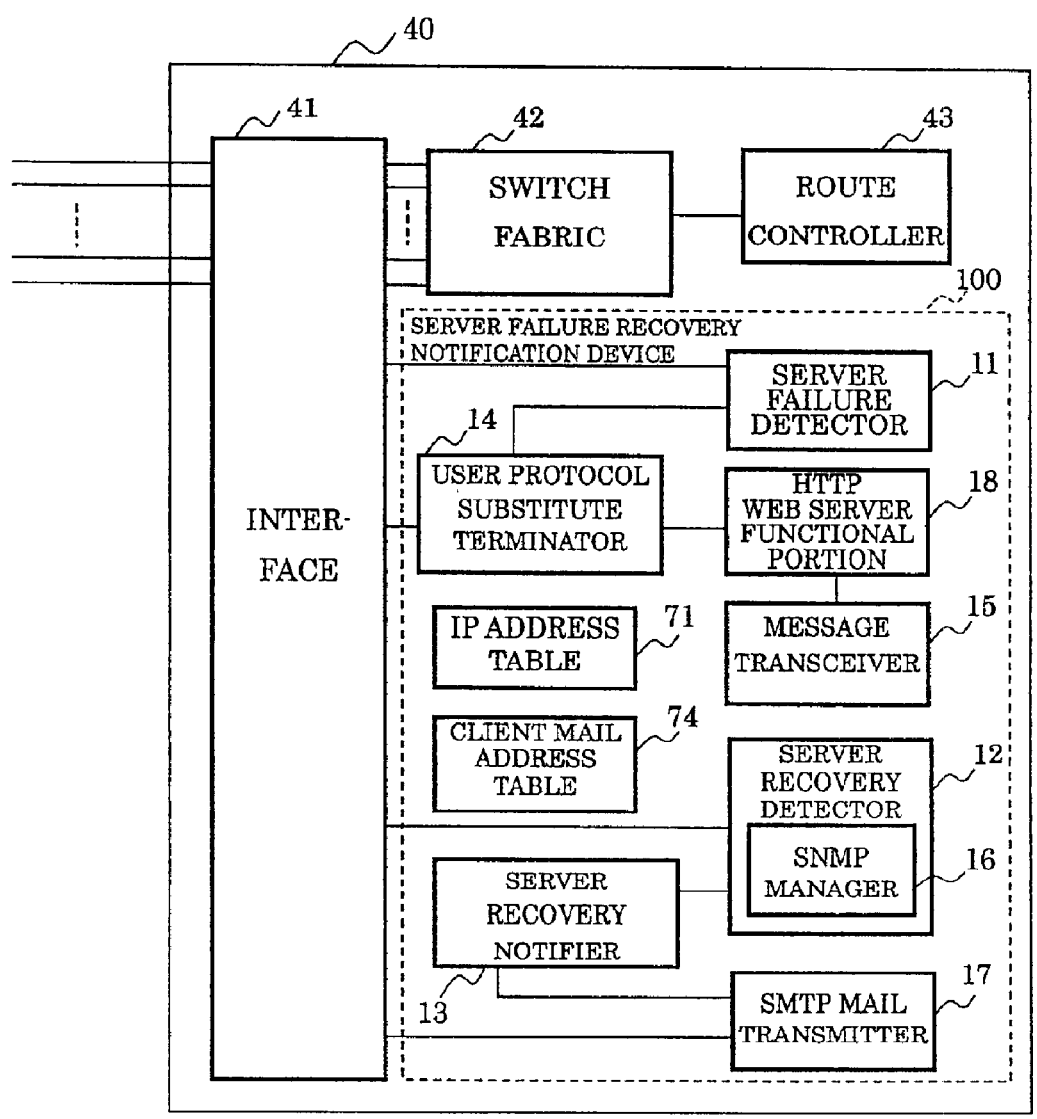
FIG. 26 is a block diagram showing embodiments (4) and (5) of a server failure recovery notification device according to the present invention.

[4] Embodiment (4): Server Failure Detection by Presence/Absence of Return IP Packet, Inquiry of Necessary/Unnecessary of Server Failure Recovery Notification, and Inquiry of Mail Address Through Connection FIG. 26 shows an embodiment (4) of the server failure recovery notification device 100 according to the present invention, in which the server failure recovery notification device 100 is added to the router 40 in the same way as embodiment (1).

The server failure recovery notification device 100 is provided with the server failure detector 11, the server recovery detector 12, the server recovery notifier 13, the SNMP manager 16, the SMTP mail transmitter 17, the IP address table 71, and the client mail address table 74 in the same way as that of the embodiment (1). The server failure recovery notification device 100 is further provided with a user protocol substitute terminator 14, a message transceiver 15, and an HTTP web server functional portion 18 different from the server failure recovery notification device 100 of the embodiment (1).

While the monitored server is stopped due to a failure, the user protocol substitute terminator 14 terminates the protocol instead of the server.

The message transceiver 15 prepares a message for prompting the input of necessary/unnecessary of the failure recovery notification and a notifying destination mail address for the user of the client, transmits/receives the message through the user protocol substitute terminator 14, and holds user input information if the notification is requested.

The HTTP web server functional portion 18 has a web server function for transmitting/receiving with an HTTP (HyperText Transfer Protocol). In the present Internet, the web access with the HTTP is the mainstream.

Figure 27:
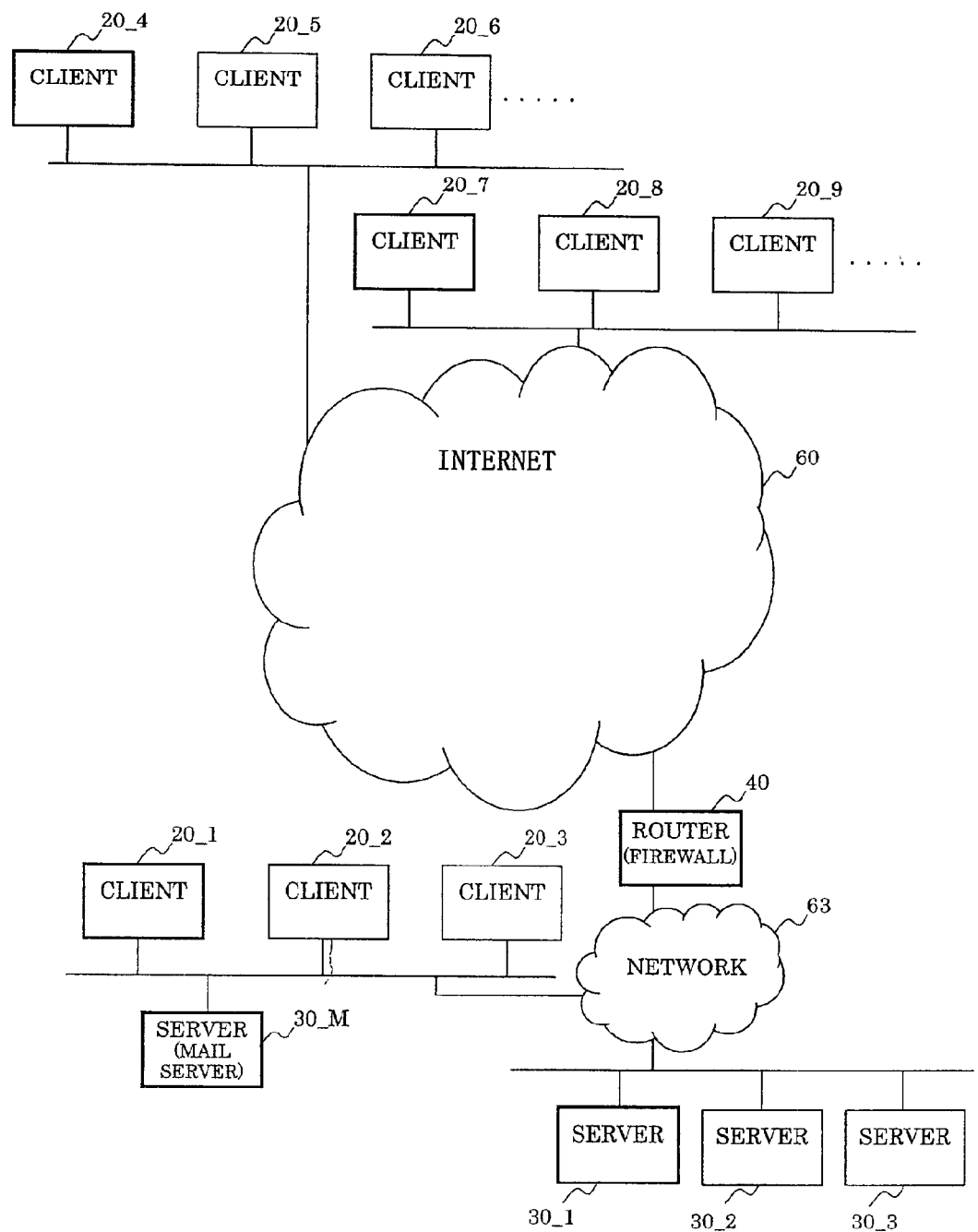
FIG. 27 is a diagram showing a network arrangement to which embodiment (4) and (5) of a server failure recovery notification device according to the present invention are applied.

FIG. 27 shows an arrangement of a network to which the server failure recovery notification device 100 of the embodiment (4) is applied. In this network, the router 40 including the server failure recovery notification device 100 according to the present invention is set up between the Internet 60 and a network 63 as a firewall.

Clients 20_4–20_6, ..., and 20_7–20_9 are connected to the Internet 60. The clients 20_1–20_3, the mail server 30_M, and the servers 30_1–30_3 are connected to the network 63.

Accordingly, the IP packets transferred from the Internet 60 to the network 63 and the IP packets transferred in the opposite direction are all transferred through the router 40. For example, when the client 20_4 connected to the Internet 60 accesses the server 30_1 within the network 63, the IP packets exchanged between the client 20_4 and the server 30_1 are transferred through the router 40.

Figures 28, 29:
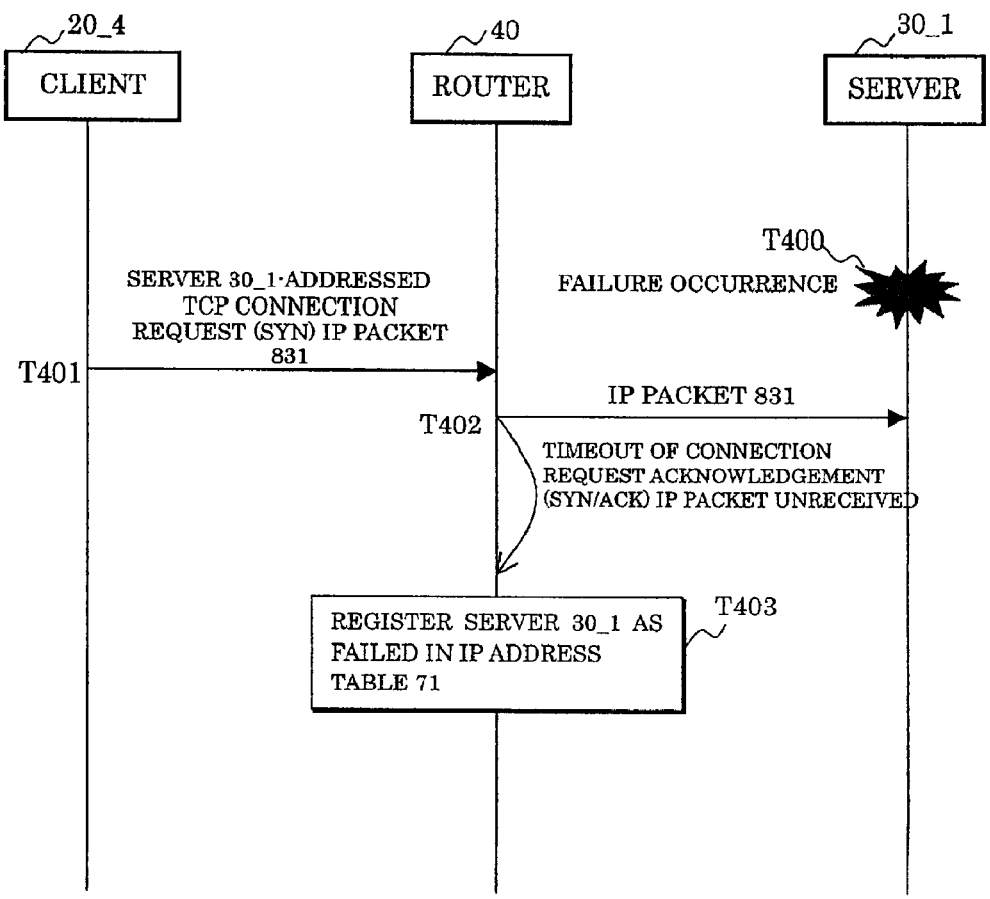
FIG. 28 is a diagram showing an example (2) of a client mail address table in an embodiment (4) of a server failure recovery notification device according to the present invention.
FIG. 29 is a sequence diagram showing a process procedure example (1) of an embodiment (4) of a server failure recovery notification device according to the present invention.

FIG. 28 shows a client mail address table 74. In this table 74, in the same way as the table 73 shown in FIG. 5, the IP address of the client and the mail address of the operator of the client are associated with each other to be set. Furthermore, "registration date and time" is added, different from the table 73.

FIG. 29 shows a process procedure example (1) in the embodiment (4). In this process procedure example, a simple protocol and a process are shown in the case where the client 20_4 accesses the server 30_1 through the router 40 in FIG. 27.

Step T400: A failure occurs in the server 30_1.

Step T401: The client 20_4 transmits a connection request (SYN) IP packet 831 to the server 30_1 in order to establish a TCP connection with the server 30_1.

Step T402: The router 40 transfers the IP packet 831 to the server 30_1. Furthermore, the router 40 can recognize the IP addresses of the source client 20_4 and the destination server 30_1 from the header (see FIG. 7A) of the IP packet 831, and that the IP packet 831 is a connection request (SYN) IP packet based on "control bit" of a TCP header.

FIG. 7B shows the format of a TCP header. This TCP header is composed of "source port No.", "destination port No.", "sequence No.", "reception acknowledgement No.", "control bit", and the like.

When the IP packet 831 is the connection request (SYN) IP packet, the server failure detector 11 in the router 40 starts the detection of a connection request acknowledgement (SYN/ACK) IP packet from the server 30_1 to the client 20_4.

Namely, the router 40 monitors the IP packet from the server 30_1. If the "control bit" of the TCP header="SYN/ACK", and "reception acknowledgement of the TCP header No."="sequence No. of the IP packet 831 from the client 20_4+1", the IP packet is determined to be the connection request acknowledgement (SYN/ACK) IP packet.

Step T403: When the server failure detector 11 can not detect the connection request acknowledgement (SYN/ACK) IP packet for more than a predetermined time, the server 30_1 is determined to be being faulted. The server failure detector 11 registers the IP address of the server 30_1 in the IP address table 71 (see FIGS. 4A and 4B) as a failed server.

Furthermore, in the presence of the access request to the server 30_1 from the client 20_4 again or from other client 20, the server failure detector 11 retrieves the IP address table 71, acknowledges whether or not the server 30_1 is being faulted. If it is not being faulted, the server failure detector 11 performs the failure detection process in the same way as the above.

When the failure has already occurred in the server 30_1, the server failure detector 11 writes the IP address of the client having requested the access in the IP address table 71 in the link form.

It is to be noted that in this example the failure occurrence of the server 30 is detected by monitoring a connection establishment time, while it is also possible to detect the failure occurrence by monitoring the sequence No. and the reception acknowledgement No. based on the presence/absence of the transmission and the reception acknowledgement regardless of the connection establishment.

Also, as for the above-mentioned predetermined time, the router (firewall) 40 preliminarily monitors a reply time from the server 30 within the network 63 and sets enough time such as 30 seconds.

Thus, the client 20 having tried but failed to access the server 30_1 can be registered in the IP address table 71.

Hereafter, in the server failure recovery notification device 100, in the same way as the embodiment (1), the server recovery detector 12 detects the failure recovery of the server 30_1. The server recovery notifier 13 transmits the failure recovery notification mail (see FIG. 8) of the server 30_1 to the mail address corresponding to the client 20 having tried to access the server 30_1 during the failure, based on the IP address table 71 and the client mail address table 74.

Thus, the operator of the client 20 having tried to access the server 30_1 during the failure has only to access the server 30_1 after receiving the failure recovery notification mail without repeating the access to the server 30_1 during the failure.

On the other hand, in the embodiment (4), due to the network arrangement (see FIG. 27) in which an access is requested from an indefinite number of clients 20 to the server 30_1 within the network 63, different from the embodiment (1), it is impossible to associate the IP address of all the clients with the mail addresses of the operators of the clients and to set the addresses in the client mail address table 74.

Accordingly, there is a possibility that the client 20 exists to which the failure recovery notification mail can not be transmitted since the mail address is not recognized when the failure has recovered.

Therefore, in the process procedure example (2) of the embodiment (4) according to the present invention shown in FIGS. 30 and 31 described next, a process for recognizing the mail address of the client having requested the access to the server 30 is included.

It is to be noted that in the process procedure (2) of the embodiment (4), the connection for transmitting "server failure notification" and "request of recovery notifying destination mail address" to the client 20 interactively for the access request from the client 20 is limited to an HTTP connection (session) to be described.

Figure 30:
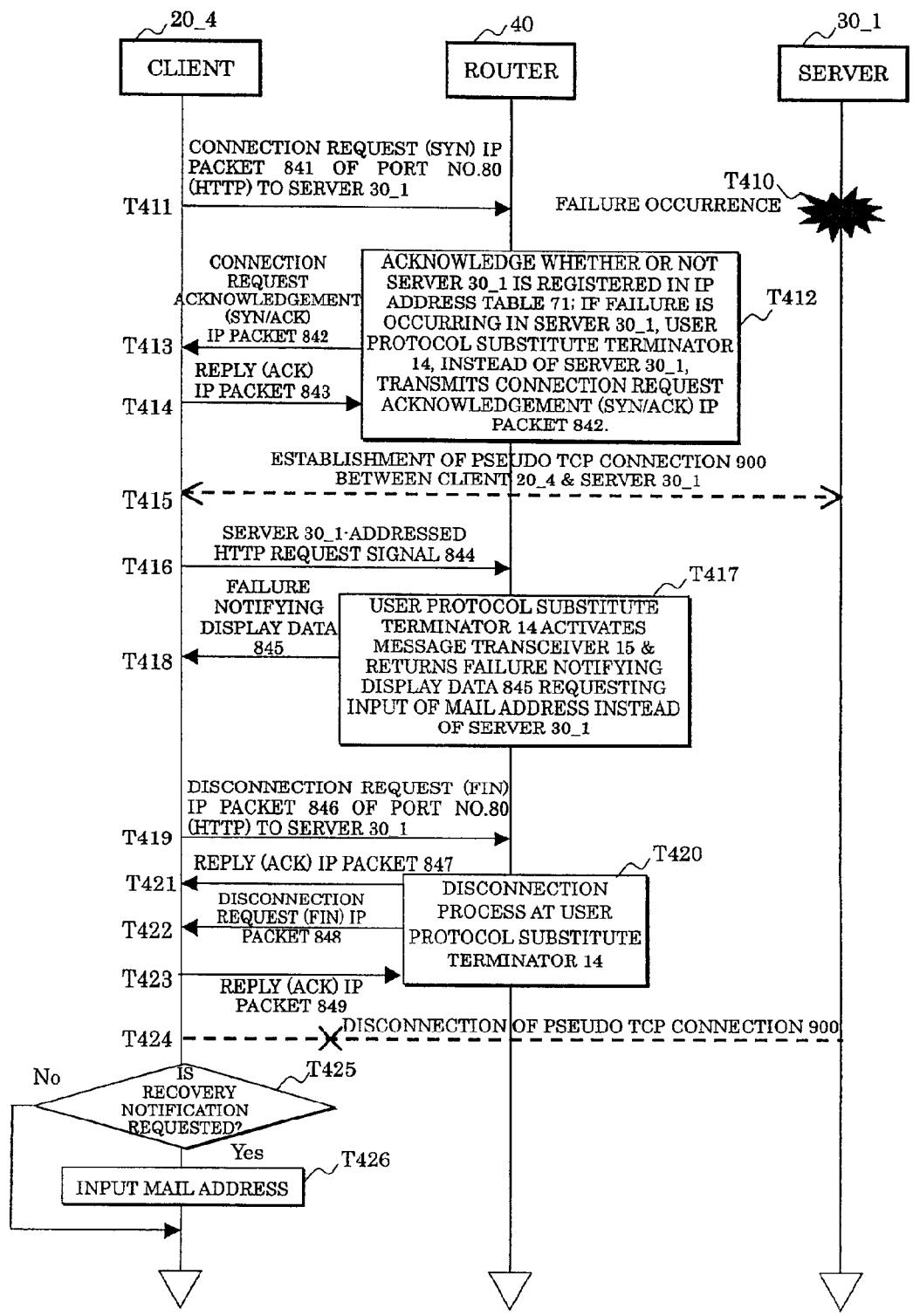
FIG. 30 is a sequence diagram showing a process procedure example (2-1) of an embodiment (4) of a server failure recovery notification device according to the present invention.

Step T410 of FIG. 30: A failure occurs in the server 30_1. The IP address of the server 30_1 in which the failure has occurred is registered in the IP address table 71 in the same operations as steps T400–T403 of FIG. 29.

Step T411: The client 20_4 transmits a connection request (SYN) IP packet 841 to the server 30_1 with a port No. 80 (HTTP).

Steps T412–T415: When the IP address of the server 30_1 is registered in the IP address table 71 (namely, when the failure has occurred in the server 30_1), the server failure detector 11 in the server failure recovery notification device 100 within the router 40 determines the access request to the server 30_1 by the HTTP when the "protocol" is "TCP" in the IP header (see FIG. 7A) of the IP packet 841, and the "destination port No." is 80 (HTTP) in the TCP header (see FIG. 7B), and then activates the user protocol substitute terminator 14.

When the "control bit" of the TCP header="connection request (SYN)", the user protocol substitute terminator 14, instead of the destination server 30_1, returns a connection request acknowledgement (SYN/ACK) IP packet 842 to the client 20_4.

The client 20_4 returns a reply (ACK) IP packet 843. Thus, a pseudo TCP connection (HTTP session) 900 is established between the client 20_4 and the server 30_1. Hereafter, the TCP connection is maintained until the disconnection is requested.

Step T416: The client 20_4 transmits an HTTP request signal 844 addressed to the server 30_1.

Steps T417 and T418: The terminator 14 having received the HTTP request signal 844 activates the message transceiver 15 through the HTTP web server functional portion 18. The message transceiver 15 returns a failure notifying display data 845 instead of the server 30_1.

Figure 32A:
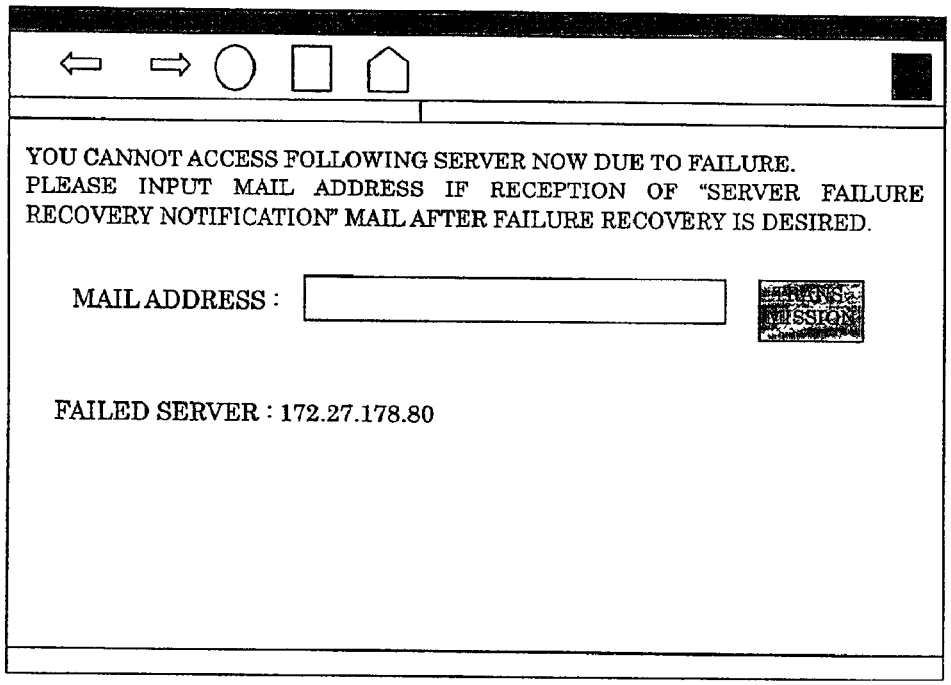
FIGS. 32A and 32B are diagrams respectively showing an inquiring screen example and a screen example of completed reception displayed on a display screen of a client in an embodiment (4) of a server failure recovery notification device according to the present invention.

FIG. 32A shows an example of a failure notifying display data 845 displayed on the display screen of the client 20_4. This screen is composed of a display of access being disabled since the failure has occurred in the server 30_1, the IP address of the server 30_1, an inquiry of whether or not the reception of the "server failure recovery notification" mail is desired when the failure of the server 30_1 has recovered, and a display for prompting the input of the mail address if it is desired.

Step T419: The client 20_4 transmits a disconnection request (FIN) IP packet 846 of the port No. 80 (HTTP) addressed to the server 30_1.

Steps T420–T424: The terminator 14, instead of the server 30_1, receives the IP packet 846, transmits a reply (ACK) IP packet 847 to the IP packet 846, and transmits a disconnection request (FIN) IP packet 848 requesting the disconnection of the TCP connection.

Since the "control bit" of the TCP header of the received IP packet 848="disconnection request (FIN)", the client 20_4 performs the disconnection process.

Thus, the TCP connection 900 pseudo-established between the client 20_4 and the server 30_1 is disconnected.

Steps T425 and T426: When the failure recovery notification is desired, the operator of the client 20_4 inputs the mail address of the operator himself or herself on the screen of the above-mentioned FIG. 32A.

Figure 31:
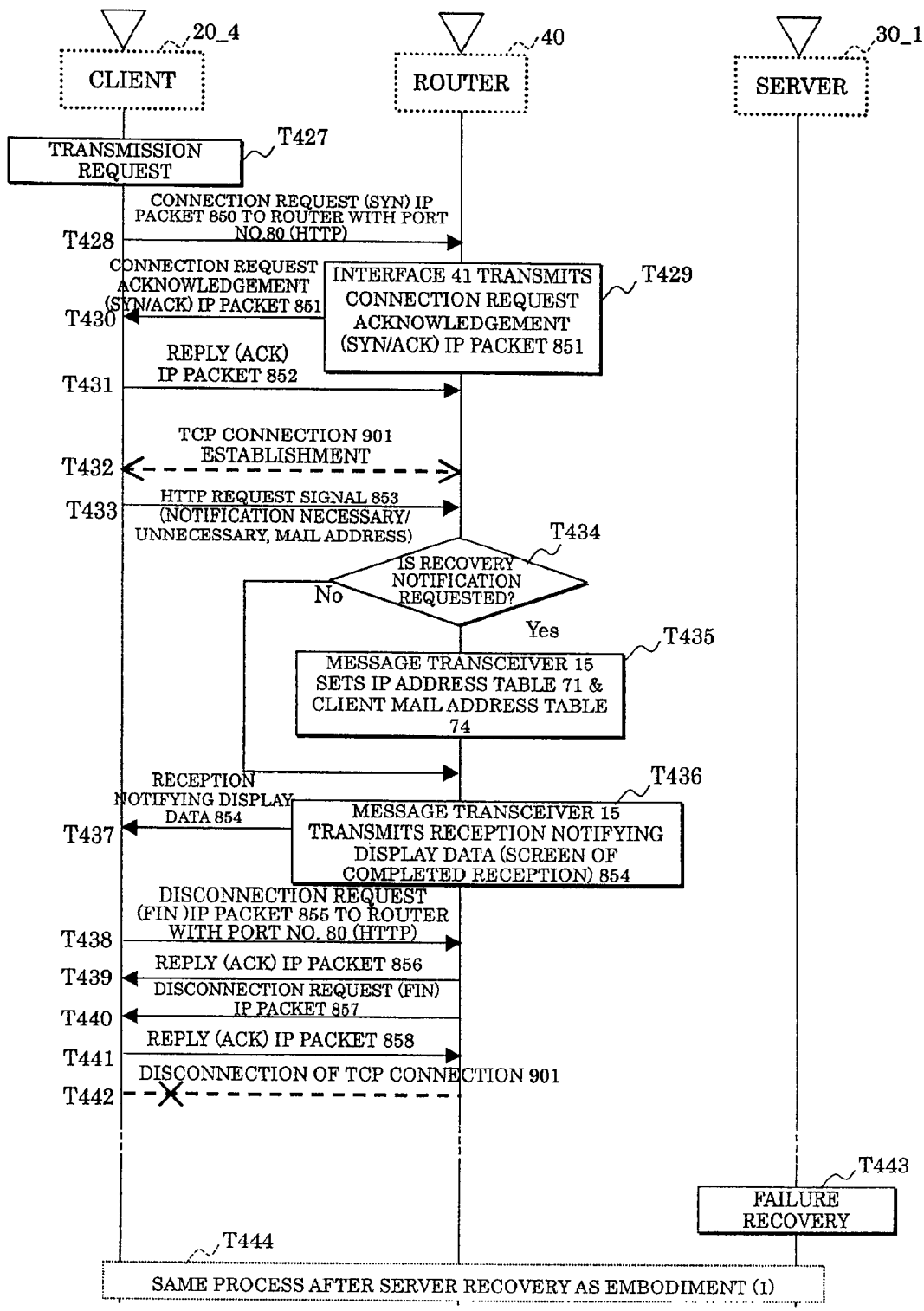
FIG. 31 is a sequence diagram showing a process procedure example (2-2) of an embodiment (4) of a server failure recovery notification device according to the present invention.

Steps T427 and T428 of FIG. 31: The client 20_4 transmits a connection request (SYN) IP packet 850 to the router 40 with the port No. 80 (HTTP).

Steps T429–T432: In the router 40, the interface 41 receives the IP packet 850, and returns a connection request acknowledgement (SYN/ACK) IP packet 851. The client 20_4 returns a reply (ACK IP packet 852 to the IP packet 851. Thus, a TCP connection 901 is established between the client 20_4 and the router 40.

Step T433: The client 20_4 transmits an HTTP request signal 853 indicating whether or not the failure recovery notification of the server 30_1 is necessary and the mail address of the notifying destination when it is necessary.

Steps T434–T437: When the failure recovery notification is necessary, the message transceiver 15 in the router 40 sets the IP address of the client 20_4 and the mail address of its operator respectively in the IP address table 71 and the client mail address table 74. Furthermore, the message transceiver 15 transmits reception notifying display data 854 for displaying the screen of completed reception.

Figure 32B:
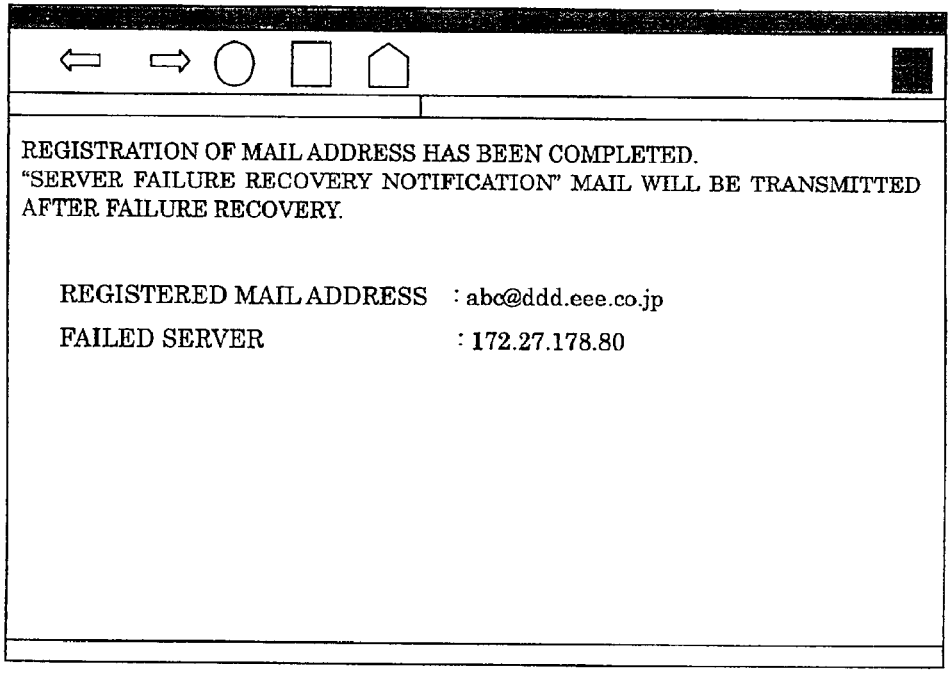

FIG. 32B shows the reception notifying display data 854 displayed on the display screen of the client 20_4. The screen displays a sentence indicating that the registration of the mail address has completed, a sentence indicating that the failure recovery of the server will be notified, a registered mail address="abc@ddd.eee.co.jp", and the IP address of the failed server 30_1="172.27.178.80".

It is to be noted that if the operator does not require the failure recovery notification at step T425, the display screen of the client 20_4 indicates that the failure recovery notification of the 30_1 will not be given.

Steps T438–T442: A disconnection request (FIN) IP packet 855, a reply (ACK) IP packet 856, and a disconnection request (FIN) IP packet 857, and a reply (ACK) IP packet 858 for disconnecting the TCP connection 901 with the port No. 80 (HTTP) are transmitted/received between the client 20_4 and the interface 41, so that the TCP connection 901 is disconnected.

Steps T443 and T444: When the failure of the server 30_1 has recovered, these steps are the same as the process procedure at steps T106–T110 of the embodiment (1) shown in FIG. 6.

Namely, the server recovery notifier 13 distributes the server failure notification mail (see FIG. 8) of the server 30_1 to the mail address of the operator registered in the client mail address table 74 within the operators or the clients 20 having tried to access the failed server 30_1 triggered by an SNMP trap message 804 from the server 30_1.

When a connection establishment reply (ACK) signal is received from the server 30_1 and the server 30_1 is registered as failed in the IP address table 71, it may be determined that the server 30_1 has recovered from its failure.

Figure 33:
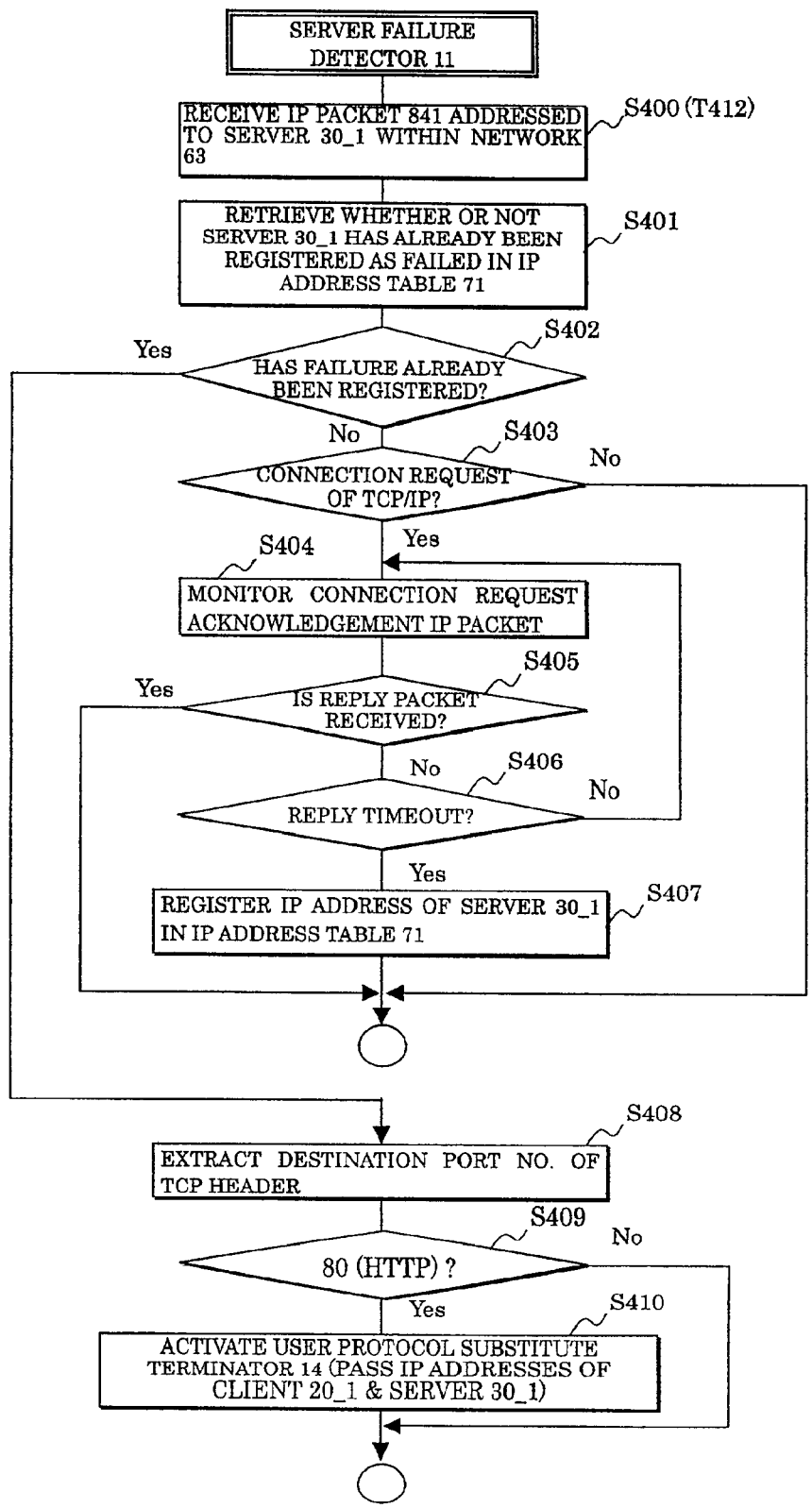
FIG. 33 is a flow chart showing a process flow example of a server failure detector in an embodiment (4) of a server failure recovery notification device according to the present invention.
Figure 34:
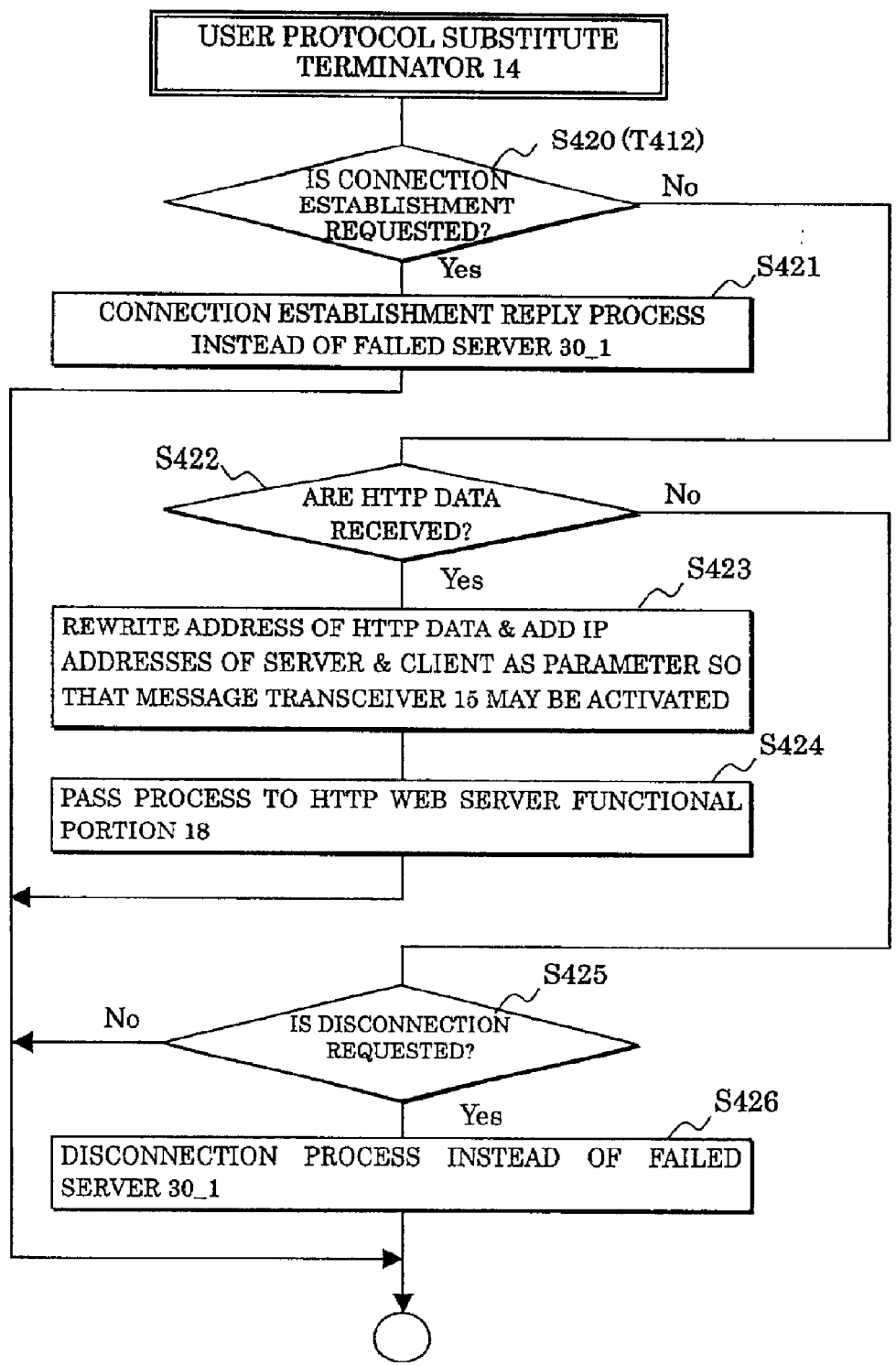
FIG. 34 is a flow chart showing a process flow example of a user protocol substitute terminator in an embodiment (4) of a server failure recovery notification device according to the present invention.
Figure 35:
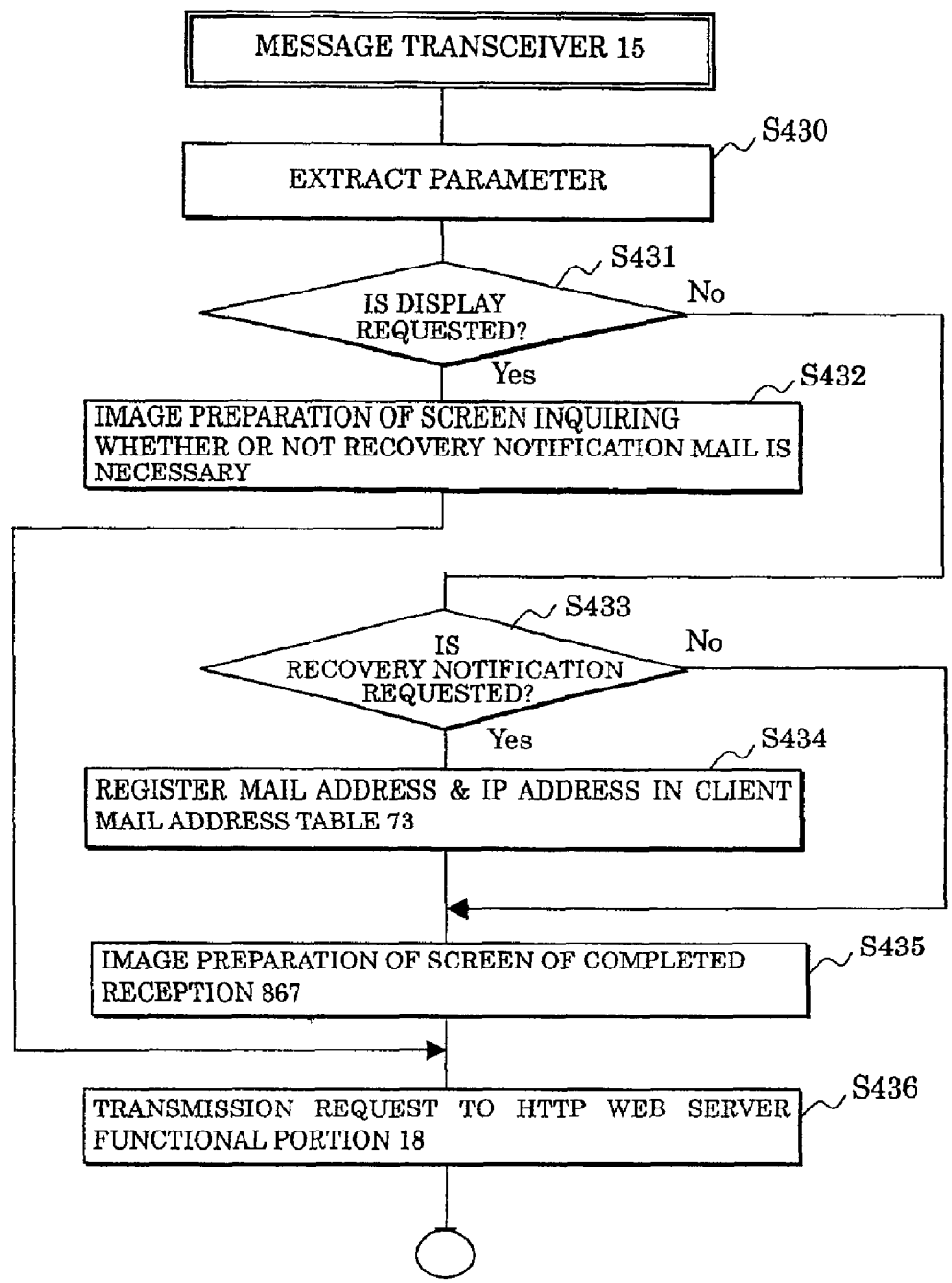
FIG. 35 is a flow chart showing a process flow example of a message transceiver in an embodiment (4) of a server failure recovery notification device according to the present invention.

FIGS. 33–35 respectively show detailed process flow examples of the server failure detector 11, the user protocol substitute terminator 14, and the message transceiver 15 in the process flow (2) of the embodiment (4).

Hereinafter, the detailed operation of the server failure detector 11 will be described referring to FIG. 33.

Step S400: The server failure detector 11 receives the IP packet 841 addressed to the server 30_1 within the network 63 (see step T411 of FIG. 30).

Steps S401–S404: The detector 11 retrieves whether or not the server 30_1 has already been registered as failed in the IP address table 71 (see FIGS. 4A and 4B). When it is not registered, the detector 11 determines whether or not the IP packet 841 is a TCP connection request. When it is the TCP connection request (SYN) IP packet, the detector 11 monitors the connection request acknowledgement (SYN/ACK) IP packet addressed to the client 20_4 from the server 30_1.

Steps S405–S407: When not receiving the connection request acknowledge (SYN/ACK) IP packet within a predetermined time, the detector 11 regards the failure is being occurred in the server 30_1, and registers the IP address of the server 30_1 in the IP address table 71 (see FIGS. 4A and 4B). When receiving the IP packet, the detector 11 ends the process without doing anything.

Thus, the IP address of the server 30_1 in which the failure has occurred is registered in the IP address table 71.

Steps S402 and S408–S410: While the server 30_1 is being faulted and its IP address is registered in the IP address table 71, the detector 11 activates the user protocol substitute terminator 14 when the destination port No. is "80" in the TCP header of the IP packet 841, and then passes the IP addresses of the client 20_4 and the server 30_1 to the terminator 14.

Thus, the terminator 14, instead of the failed server 30_1, can terminate the HTTP. When the destination port No. ≠"80", the detector ends the process without doing anything.

It is to be noted that only when the IP address of the request client is not registered in the client mail address tables 73 and 74 (see FIGS. 5 and 28), the detector 11 may activate the user protocol substitute terminator 14.

Also, when the difference between the registration time (time when the access was requested to the failed server in the past and the mail address was registered for the notification request) of the mail address of the client held by the client mail address table 74 and the present time (time when the server to which the access has been requested this time has recovered) is large, there is a possibility that the mail address is changed.

When it is changed, the failure recovery notification mail of the server 30_1 is not transmitted to the mail address corresponding to the client 20 having requested the access.

Therefore, the detector 11 may activate the user protocol substitute terminator 14 and inquire the mail address corresponding to the client 20 again, if a fixed period expires after the date and time when the IP address of the client 20_4 was registered in the client mail address table 74.

Hereinafter, the detailed operation of the user protocol substitute terminator 14 will be described referring to FIG. 34.

Steps S420 and S421: When the received IP packet is a connection request (SYN) IP packet, the terminator 14, instead of the failed server 30_1, performs the process for establishing the connection, i.e. the TCP connection 900 (see steps T412–T415 of FIG. 30).

Steps S420 and S422–S424: When the received IP packet is HTTP data, the terminator 14 rewrites the address of the HTTP data, and adds the IP addresses of the server and the client to the HTTP data as a parameter in order to activate the message transceiver 15.

Furthermore, the terminator 14 passes the HTTP data to the HTTP web server functional portion 18 (see step T417 of FIG. 30).

Hereafter, the HTTP web server functional portion 18 performs a process (activation) corresponding to the designated address.

Steps S422, S425, and S426: When the received IP packet is a disconnection request (FIN) IP packet, the terminator 14, instead of the failed server 30_1, performs the disconnection process of the TCP connection 900 (see steps T419–T424 of FIG. 30).

Hereinafter, the detailed operation of the massage transceiver 15 will be described referring to FIG. 35.

Steps S430, S431, S432, and S436: The transceiver 15 extracts the parameter. When it is a display request, the followings are prepared; "A sentence indicating that a failure is being occurred in the accessed server 30_1, a sentence inquiring whether or not the reception of the failure recovery notification mail is requested at the time of the failure recovery of the server 30_1, and a screen image (HTML data, see FIG. 32A) requesting the input of the client mail address if the failure recovery notification mail is requested".

The transceiver 15 requests the HTTP web server functional portion 18 to transmit the screen image.

Hereafter, the HTTP web server functional portion 18 prepares the failure notifying display data 845 for transmitting a screen image to be transmitted to the client 20_1 (see steps T417 and T418 of FIG. 30). The address which directly activates the message transceiver 15 as a transmitting destination (access destination) address at the time when the client 20_4 has selected the notification necessary/unnecessary is imbedded in the failure notifying display data 845.

Steps S431 and S433–S436: When the operator of the client 20_4 inputs "the necessary/unnecessary of the failure recovery notification mail", and "the transmitting destination mail address of the notification when the failure recovery notification is required", a transmitting destination (access destination) address of the HTTP request signal 853 (see T433 of FIG. 31) for notifying the input is an address which activates the message transceiver 15.

Also, the client 20_4 prepares the HTTP request signal 853 including the IP addresses of the server 30_1 and the client 20_4 as a parameter.

The HTTP request signal 853 is transmitted to the message transceiver 15 not through the user protocol substitute terminator 14 but through the HTTP web server functional portion 18.

When the parameter is a recovery notification request, the transceiver 15 registers the mail address and the IP address in the client mail address table 74. It is to be noted that the message transceiver 15 may extract the IP addresses of the client and the server with the parameter and may register the IP address of the client 20_4 in the link corresponding to the failed server 30_1 of the IP address table 71.

Furthermore, the transceiver 15 prepares the screen image of completed reception (see FIG. 32B), and requests the HTTP web server functional portion 18 to transmit the image. The HTTP web server functional portion 18 prepares the reception notifying display data 854 for transmitting the screen image to be transmitted to the client 20_1 (see steps T433–T437 of FIG. 31).

Thus, the screen of FIG. 32A or FIG. 32B is displayed on the display screen of the client 20_4.

[5] Embodiment (5): Server Failure Detection by Presence/Absence of Return IP Packet, Inquiry of Necessary/Unnecessary of Server Failure Recovery Notification, and Inquiry of Mail Address Through Pseudo Connection Hereinafter, an embodiment (5) of the server failure recovery notification device 100 according to the present invention will be described. The arrangement of the server failure recovery notification device 100 of the embodiment (5) is the same as the that of the embodiment (4) shown in FIG. 26, and the network arrangement to which the device 100 is applied is the same as that of the embodiment (4) shown in FIG. 27.

In the process procedure example of the embodiment (4) shown in FIGS. 30 and 31, the data (HTTP request signal 853) indicating "necessary/unnecessary of the failure recovery notification mail" and "mail address of the operator of the client" are directly transmitted to the message transceiver 15 of the server failure recovery notification device 100 added to the router 40 through the TCP connection 901 established between the client 20_4 and the router 40 (see steps T432–T435 in FIG. 31).

In the embodiment (5), the transmitting destination of the data is set to the failed server 30_1, namely, the pseudo TCP connection is established between the client 20_4 and the server 30_1 and the user protocol substitute terminator 14 within router 40, instead of the server 30_1, captures the data.

Figure 36:
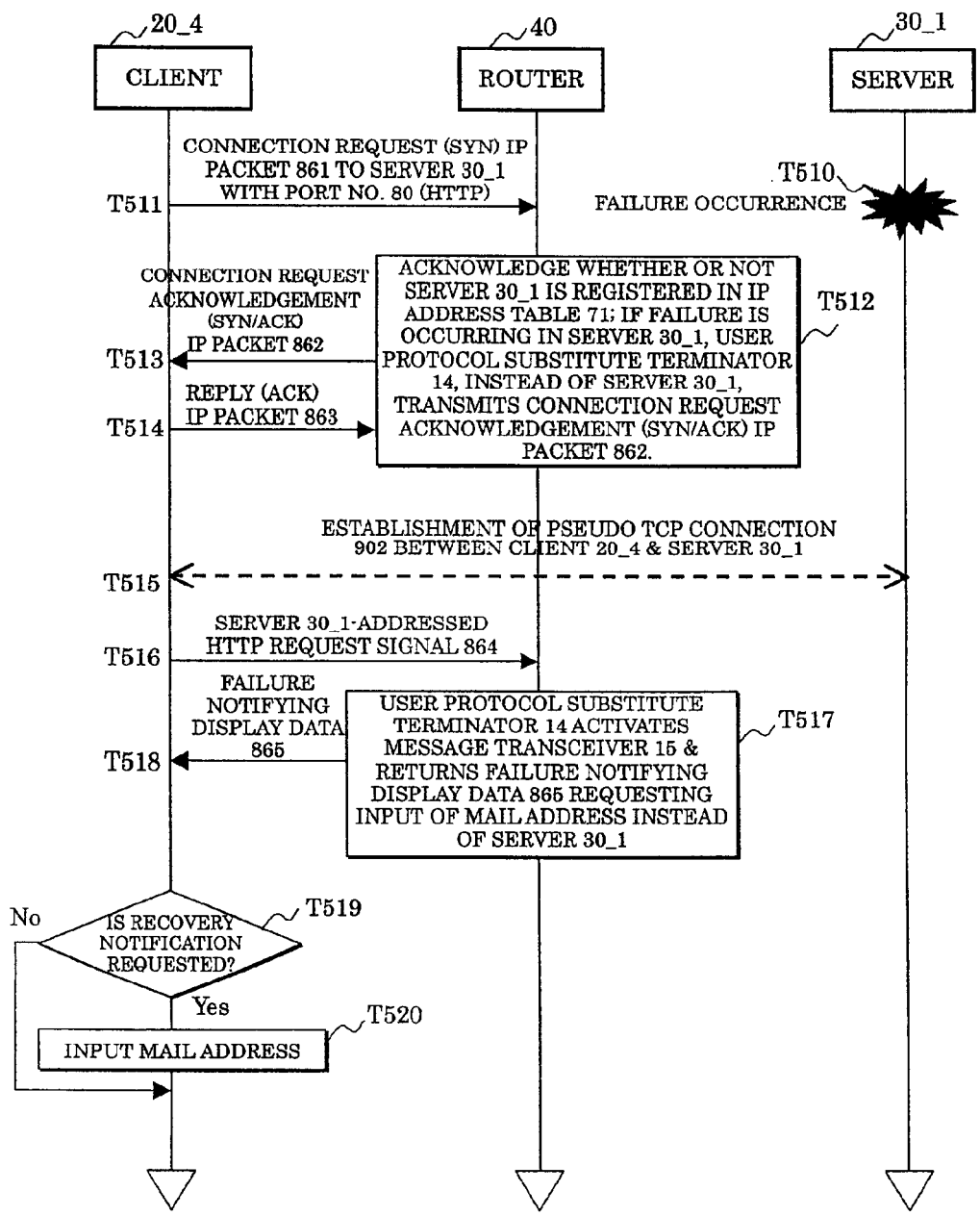
FIG. 36 is a sequence diagram showing a process procedure example (1-1) of an embodiment (5) of a server failure recovery notification device according to the present invention.
Figure 37:
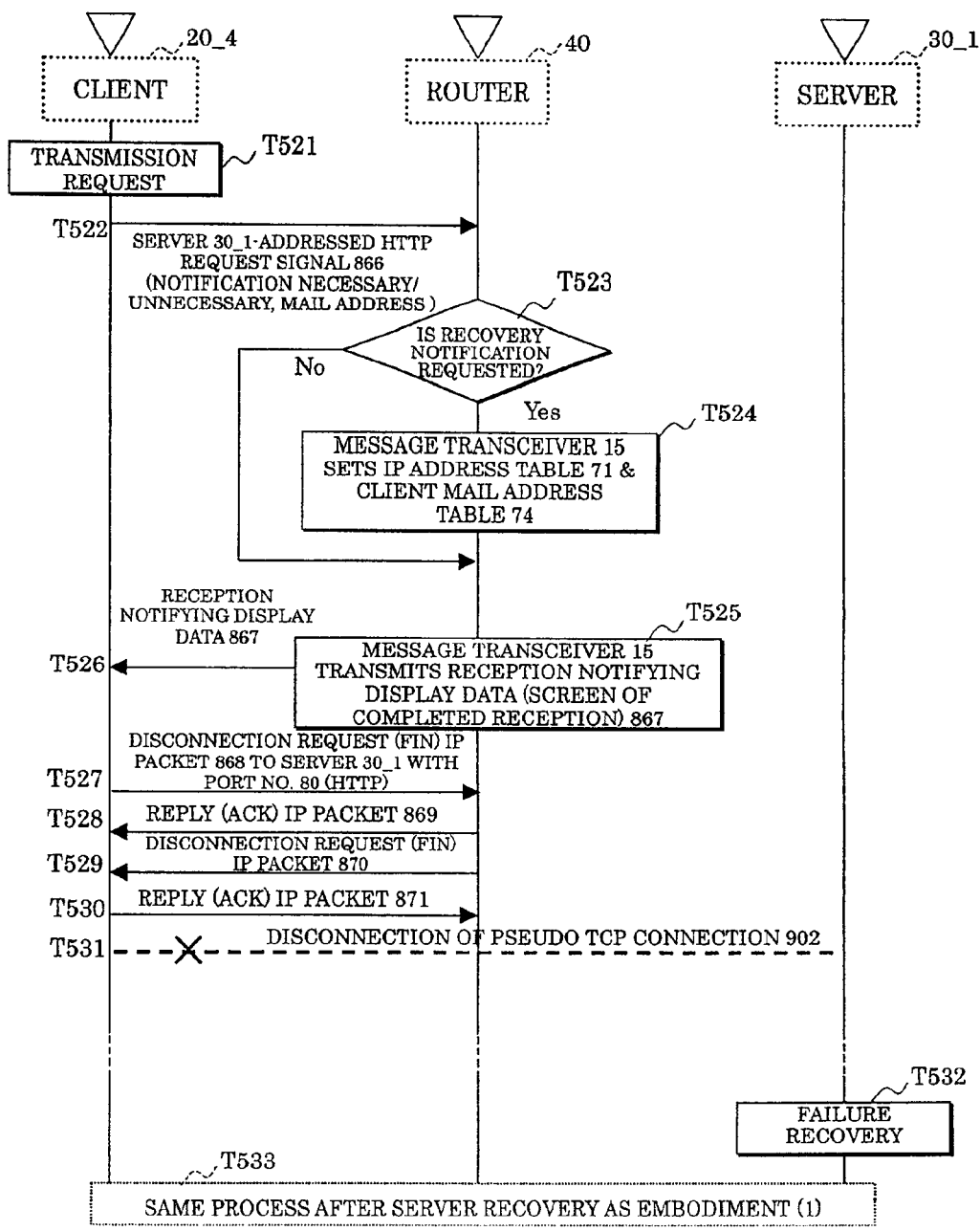
FIG. 37 is a sequence diagram showing a process procedure example (1-2) of an embodiment (5) of a server failure recovery notification device according to the present invention.

FIGS. 36 and 37 show a process procedure example in the embodiment (5). Hereinafter, the process procedure example will be described.

Steps T510–T518: A failure occurs in the server 30_1. A pseudo TCP connection 902 is established between the client 20_4 having tried to access the server 30_1 and the server 30_1. Through this connection, the failure notifying display data of the server 30_1 are transmitted to the client 20_4, so that the inquiring screen shown in FIG. 32A is displayed on the screen of the client 20_4.

The above-mentioned operation is the same as steps T410–T418 of the embodiment (4) shown in FIG. 30.

Steps T519–T522: The operator of the client 20_4 inputs whether or not the failure recovery notification of the server 30_1 is requested. Inputted data "necessary/unnecessary of the failure recovery notification mail" and "mail address of the operator of the client" are transmitted to the message transceiver 15 with the HTTP request signal 866 addressed to the server 30_1 through the pseudo TCP connection 902 and the user protocol substitute terminator 14 which terminates the TCP connection 902.

The above-mentioned operation corresponds to steps T425–T427, T432, and T433 of the embodiment (4) shown in FIG. 31, while in the embodiment (4) the data are transmitted through the TCP connection 901 established between the client 20_4 and the router 40.

Steps T523–T526: When the failure recovery notification mail is requested, the message transceiver 15 sets the IP address and the mail address of the client 20_4 respectively in the IP address table 71 and the mail address table 74.

Furthermore, the transceiver 15 transmits a reception notifying display data 867 to the client 20_4. On the display screen of the client 20_4, a screen of completed reception shown in FIG. 32B is displayed. The above-mentioned operation corresponds to steps T434–T437 in FIG. 31, while in the embodiment (4) the reception notifying display data are transmitted through the pseudo TCP connection 902 established between the client 20_4 and the router 40.

Steps T527–T531: The pseudo TCP connection 902 is disconnected.

Steps T532 and T533: The server 30_1 recovers from the server. Hereafter, the failure recovery notification mail is distributed to the client 20_4, etc. requiring the failure recovery notification in the same way as steps T107–T110 of the embodiment (1) shown in FIG. 6.

In the same way as the embodiment (4), an indefinite number of operators of the client 20 having tried to access the failed server 30 can receive the failure recovery notification mail of the server 30 if necessary when the failure of the server 30 has recovered.

As described above, a method for notifying a server failure recovery according to the present invention is arranged so that a first step detects a client having tried but failed to access a server due to a failure; a second step detects that the failure has recovered; and a third step notifies to the client having failed to access the server that the failure has recovered. Also, a server failure recovery notification device according to the present invention is arranged such that a server failure detector detects a client having tried but failed to access a server due to a failure; a server recovery detector detects that the failure has recovered; and a server recovery notifier notifies to the client having failed to access the server that the failure of the server has recovered directly or through the server or a network management apparatus.

Such a method and a device prevent a client or its operator who knows that a notification is received when a failure has recovered from repeatedly trying a useless access to a server to which an access can not be performed for a failure occurrence, and enable the client or its operator to reliably access the server after the failure recovery notification is received.

Also, the failure recovery notification has only to be given to a client having tried to access during the failure occurrence, which prevents e.g. a network manager from being troubled to give a notification to all the clients which may use the server.

Furthermore, since the client having tried but failed to access the server is detected at the first step or by the server failure detector, it is not necessary for the client to register itself as a standby client.

Also, the server failure recovery notification device according to the present invention is mounted on a router. The server failure detector detects a client having failed to access based on a destination unreachable message of an ICMP of the router, or monitors an IP packet addressed to the client from the server corresponding to the IP packet addressed to the server from the client, in the absence of the IP packet, the server failure detector determines that the failure is being occurred in the server and detects the client having failed to access. Thus, it becomes possible to easily detect, by utilizing a router function, a client having tried but failed to access the failed server.

Also, a client mail address table associating the IP address of the client with a mail address is provided, and an e-mail indicating that the failure of the server has recovered based on the table is transmitted to the mail address. Therefore, it becomes possible for the client or its operator to realize that the failure of the server has recovered.

Also, a message transceiver inquires the client having tried but failed to access the server whether or not the failure recovery notification is necessary when the failure has recovered. Therefore, the server recovery notifier does not have to transmit a failure recovery notification addressed to the client not requiring the failure recovery notification, thereby decreasing the network traffic.

Also, the message transceiver inquires the client having tried but failed to access the server about the destination of the failure recovery notification. Therefore, the server recovery notifier can realize the destination of the client or its operator whose destination of the server failure recovery notification is not known and can transmit the failure recovery notification to an indefinite number of clients accessing the server.

What we claim is:

1. A server failure recovery notification device comprising:
    a server failure detector for detecting a client having tried but failed to access a server due to a failure of at least one of the server and a network;
    a server recovery detector for detecting that the failure has recovered;
    a server recovery notifier for notifying, when the failure has recovered, the client having failed to access the server that the failure has recovered; and
    a message transceiver for transmitting/receiving an inquiring message inquiring whether or not a failure recovery notification is required and a reply message to the inquiring message to/from the client having tried but failed to access the server when the failure has recovered,
    the server recovery notifier giving the failure recovery notification to the client which requires the failure recovery notification.

2. The server failure recovery notification device as claimed in claim 1 wherein the device is mounted on a router.

3. The server failure recovery notification device as claimed in claim 1 wherein the device is mounted on a component other than a router.

4. The server failure recovery notification device as claimed in claim 1 wherein the server recovery detector detects that the failure has recovered based on a signal from the server indicating that the failure has recovered.

5. The server failure recovery notification device as claimed in claim 4 wherein the server recovery detector has an SNMP manager function, and the SNMP manager function receives a trap message from the server having an SNMP agent function as the signal.

6. The server failure recovery notification device as claimed in claim 1 wherein the server recovery notifier has a client mail address table in which a client is preliminarily associated with a mail address, and transmits an e-mail addressed to the mail address indicating that the failure of the server has recovered based on the table.

7. The server failure recovery notification device as claimed in claim 1 wherein the server recovery notifier transmits, to the server, IP address information of the client having failed to access the server based on an IP address table when the failure of the server has recovered, thereby enabling the server to notify the client that the failure of the server itself has recovered.

8. The server failure recovery notification device as claimed in claim 7 wherein the server has a client mail address table indicating a client and a client mail address corresponding to the client, thereby enabling the server to notify the client having failed to access the server itself that the failure of the server itself has recovered based on the client mail address table and the IP address information of the client.

9. The server failure recovery notification device as claimed in claim 1, further comprising:
   a user protocol substitute terminator for terminating, instead of the server, a connection in which a failure has occurred,
   the message transceiver transmitting/receiving the messages through the terminator.

10. The server failure recovery notification device as claimed in claim 1 wherein the message transceiver registers an IP address of the client which requires the failure recovery notification in an IP address table.

11. A server failure recovery notification device mounted on a router, comprising:
    a server failure detector for detecting a client having tried but failed to access a server due to a failure of at least one of the server and a network;
    a server recovery detector for detecting that the failure has recovered; and
    a server recovery notifier for notifying, when the failure has recovered, the client having failed to access the server that the failure has recovered,
    wherein the server failure detector detects a destination unreachable message indicating that a packet transmitted from the client in order to try to access the server has not reached the server, and has an IP address table for specifying the client having failed to access by associating an IP address of the server included in the message with an IP address of the client.

12. The server failure recovery notification device as claimed in claim 11 wherein the server recovery notifier transmits IP address information of the client having failed to access the server to a network management apparatus based on the IP address table when the failure of the server has recovered, thereby enabling the network management apparatus to notify the client that the failure of the server has recovered.

13. The server failure recovery notification device as claimed in claim 12 wherein the network management apparatus has a client mail address table indicating a client and a mail address corresponding to the client, thereby enabling the network management apparatus to notify the client having failed to access the server that the failure of the server has recovered based on the client mail address table and the IP address information of the client.

14. A server failure recovery notification device mounted on a router, comprising:
    a server failure detector for detecting a client having tried but failed to access a server due to a failure of at least one of the server and a network;
    a server recovery detector for detecting that the failure has recovered; and
    a server recovery notifier for notifying, when the failure has recovered, the client having failed to access the server that the failure has recovered.
    wherein the server failure detector detects a destination IP address and a source IP address included in a packet addressed to the server from the client transferred by the router, monitors an IP packet addressed to the client from the server transferred by the router, determines that a failure is being occurred in the server when the IP packet addressed to the client from the server is not detected even after a lapse of a predetermined time, and has an IP address table for specifying the client having failed to access by associating the destination IP address with the source IP address.

15. The server failure recovery notification device as claimed in claim 14 wherein the server recovery notifier transmits IP address information of the client having failed to access the server to a network management apparatus based on the IP address table when the failure of the server has recovered, thereby enabling the network management apparatus to notify the client that the failure of the server has recovered.

16. The server failure recovery notification device as claimed in claim 15 wherein the network management apparatus has a client mail address table indicating a client and a mail address corresponding to the client, thereby enabling the network management apparatus to notify the client having failed to access the server that the failure of the server has recovered based on the client mail address table and the IP address information of the client.

17. A server failure recovery notification device comprising:
    a server failure detector for detecting a client having tried but failed to access a server due to a failure of at least one of the server and a network;
    a server recovery detector for detecting that the failure has recovered;
    a server recovery notifier for notifying, when the failure has recovered, the client having failed to access the server that the failure has recovered; and
    a message transceiver for transmitting/receiving an inquiring message of a destination of a failure recovery notification and a reply message to the inquiring message to/from the client having tried but failed to access the server,
    the server recovery notifier transmitting the failure recovery notification of the destination.

18. The server failure recovery notification device as claimed in claim 17, further comprising:
    a user protocol substitute terminator for terminating, instead of the server, a connection in which a failure has occurred,
    the message transceiver transmitting/receiving the messages through the terminator.

* * * * *